(12) United States Patent
Alvarez

(10) Patent No.: US 11,430,316 B2
(45) Date of Patent: Aug. 30, 2022

(54) WEARABLE DEVICE AND SYSTEM FOR TRACKING

(71) Applicant: Claudia Lucia Alvarez, Providence, RI (US)

(72) Inventor: Claudia Lucia Alvarez, Providence, RI (US)

( * ) Notice: Subject to any disclaimer, the term of this patent is extended or adjusted under 35 U.S.C. 154(b) by 0 days.

(21) Appl. No.: 16/990,925

(22) Filed: Aug. 11, 2020

(65) Prior Publication Data

US 2022/0051542 A1    Feb. 17, 2022

(51) Int. Cl.
*G08B 21/02* (2006.01)
*B60R 25/24* (2013.01)

(52) U.S. Cl.
CPC .......... *G08B 21/0261* (2013.01); *B60R 25/24* (2013.01); *G08B 21/0211* (2013.01); *G08B 21/0266* (2013.01); *G08B 21/0269* (2013.01); *G08B 21/0294* (2013.01)

(58) Field of Classification Search
CPC ............ G08B 21/0261; G08B 21/0266; G08B 21/0269; G08B 21/0294; G08B 21/0211; B60R 25/24
USPC .......................................... 340/539.12, 539.1
See application file for complete search history.

(56) References Cited

U.S. PATENT DOCUMENTS

| 6,396,403 | B1 | 5/2002 | Haner |
| 8,081,072 | B2 | 12/2011 | Scalisi et al. |
| 9,554,629 | B1 | 1/2017 | Wilcox et al. |
| 10,446,006 | B1* | 10/2019 | Johnson, Jr. ......... G08B 25/008 |
| 2006/0232429 | A1 | 10/2006 | Gonzalez |
| 2007/0200695 | A1 | 8/2007 | Almstrand et al. |
| 2008/0238768 | A1 | 10/2008 | Nosworthy |
| 2010/0238033 | A1* | 9/2010 | Blumel ................. A61B 5/681 340/573.4 |
| 2013/0109342 | A1* | 5/2013 | Welch .................... G08B 21/22 455/404.2 |
| 2015/0334524 | A1 | 11/2015 | Fetzer et al. |
| 2016/0249815 | A1* | 9/2016 | Freeman ........... A61B 5/02438 600/483 |
| 2017/0035367 | A1* | 2/2017 | Reich ..................... A61B 5/746 |
| 2019/0086114 | A1* | 3/2019 | Nakashima ........... G05B 15/02 |
| 2020/0273312 | A1* | 8/2020 | Nagy .................... G01S 13/751 |
| 2021/0122330 | A1* | 4/2021 | Sung .................... B60R 25/305 |

FOREIGN PATENT DOCUMENTS

WO    WO-2013/090427       6/2013
WO    WO-2014/072672 A1    5/2014

* cited by examiner

*Primary Examiner* — Ryan W Sherwin
(74) *Attorney, Agent, or Firm* — Wilmer Cutler Pickering Hale and Dorr LLP

(57) ABSTRACT

A wearable device and a system for tracking the wearable device may enhance safety and peace of mind for a parent or caretaker of a child or other individual. The system may include a computing device, such as a smartphone, executing an application that provides alerts based on a distance between the computing device and the wearable device exceeding a threshold distance, based on the wearable device crossing a define geographic boundary, or one or more similar triggers. The wearable device may include an input button that allows a user of the wearable device to send a signal to the computing device of the parent or caretaker. An alert on the computing device might be disabled by pressing the input button on the wearable device.

19 Claims, 23 Drawing Sheets

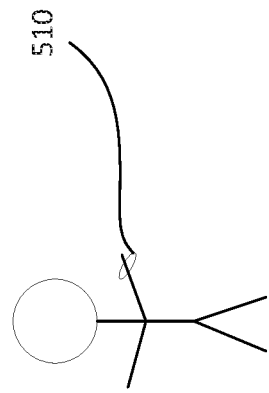
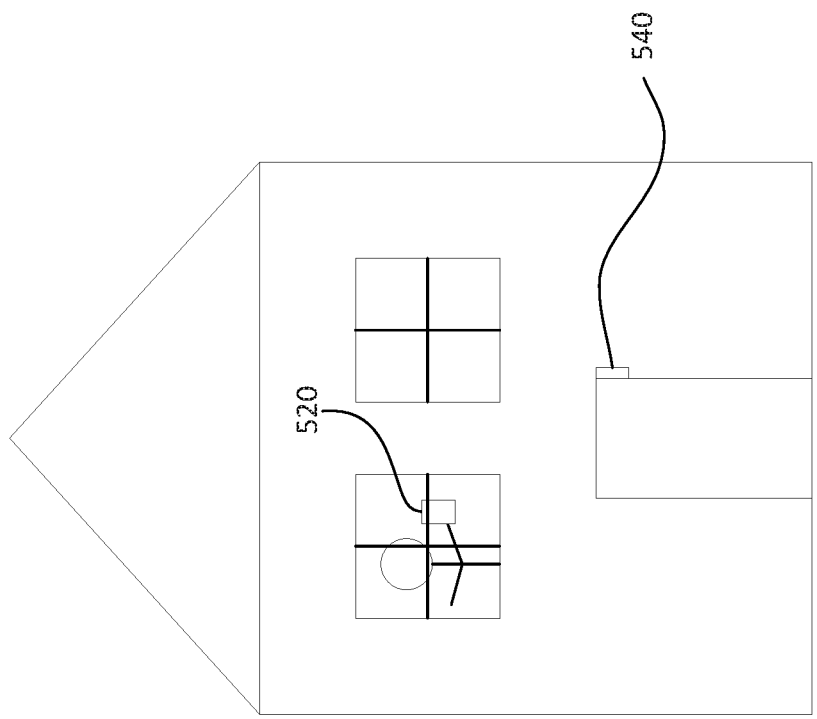
FIG. 5

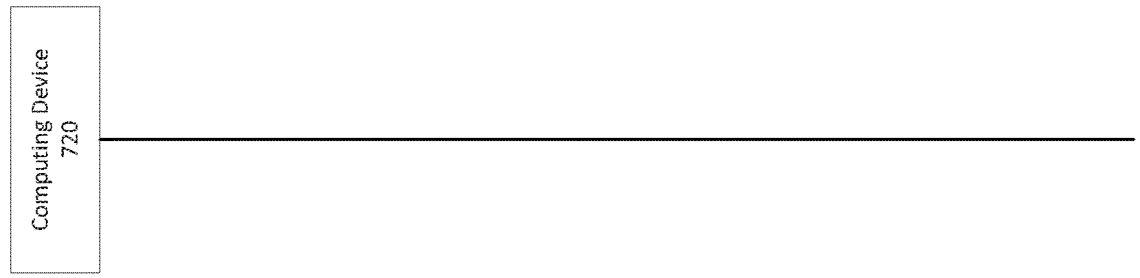
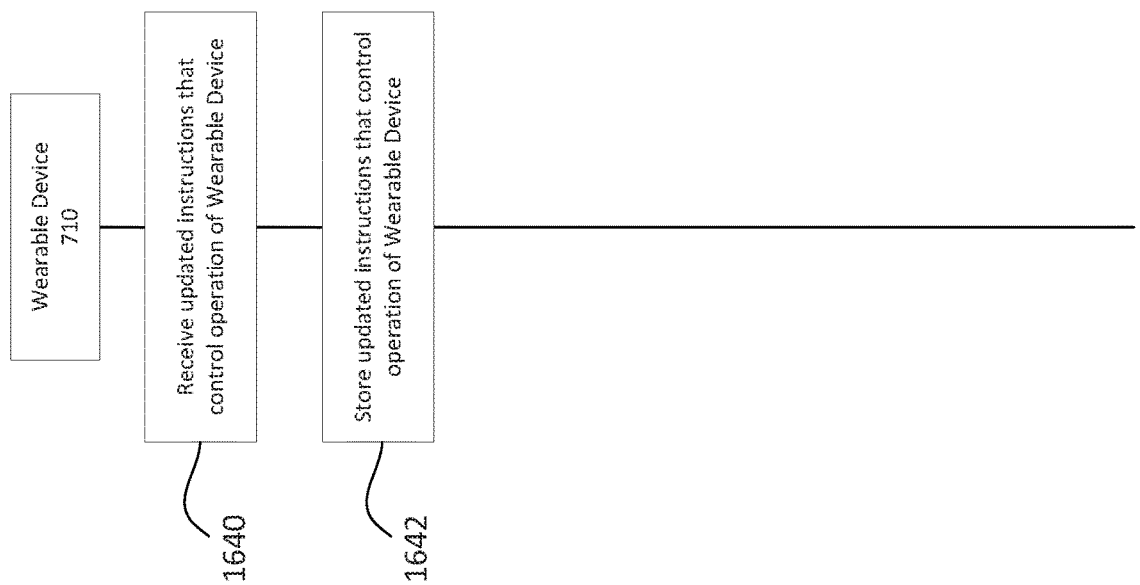
FIG. 16

Alert:
You are too far away from your child.
Return to your child!

FIG. 23A

Alert:
You are too far away from your child.
Your child is in your vehicle.
Return to your vehicle and retrieve your child!

FIG. 23B

Alert:
High temperature warning in your area today.
You are too far away from your child.
Return to your child!

FIG. 23C

Alert:
Door A of your home was opened at 6:04 PM.
You are too far away from your child.
Go find your child!

FIG. 23D

WEARABLE DEVICE AND SYSTEM FOR TRACKING

BACKGROUND

Child safety is a high priority. Children are prone to wander off and explore, whether in a new place or a familiar one, and often do so regardless of whether a parent or caretaker is aware of the child's location. Some children are abducted. Even the most vigilant parents or caretakers may leave children behind in a vehicle, in a store, or at home, thereby creating an unsafe situation. Older children or teenagers often spend time with their friends or outside their homes. Thus, there will always be a need for improved systems for tracking whereabouts of children and helping parents or caretakers gain more peace of mind and decrease the risk of unsafe situations.

SUMMARY

The following summary includes a simplified summary of certain features. The summary is not an extensive overview and is not intended to identify key or critical elements.

One or more embodiments may include a system including a first device and a second device. The first device may include a silicone band configured to be worn around a wrist of a user or an ankle of the user, the silicone band holding a waterproof housing with an external universal serial bus (USB) interface and an input button. The waterproof housing may include: a global positioning system (GPS) device; a cellular network radio; a short-range wireless device; a rechargeable battery configured to be rechargeable via the external USB interface; a processor; and memory storing instructions that, when executed by the processor of the first device, cause the first device to: receive, via the input button, an indication that the input button on the first device was pressed; in response to receiving the indication that the input button on the first device was pressed, send, via the cellular network radio and to a second device, a signal that the input button on the first device was pressed; receive, via the GPS device, signals indicative of a geographic location of the first device; determine, based on the signals indicative of the geographic location of the first device, the geographic location of the first device; send, via the cellular network radio and to the second device, the geographic location of the first device; and establish, via the short-range wireless device, a short-range wireless connection with the second device. The second device may include a processor; and memory storing instructions that, when executed by the processor of the second device, cause the second device to: receive the signal that the input button on the first device was pressed; in response to receiving the signal that the input button on the first device was pressed, generate an alert indicating that the input button on the first device was pressed; receive the geographic location of the first device; determine, based on the geographic location of the first device, whether the first device is outside a defined geographic boundary; in response to determining that the first device is outside the defined geographic boundary, generate an alert indicating that the first device is outside the defined geographic boundary; determine, based on the short-range wireless connection, whether a distance between the first device and the second device is greater than a threshold distance; and in response to determining that the distance between the first device and the second device is greater than the threshold distance, generate an alert indicating that the distance between the first device and the second device is greater than the threshold distance.

In one or more embodiments, the memory of the second device may store instructions that, when executed by the processor of the second device, cause the second device to: in response to receiving the signal that the input button on the first device was pressed, provide, with the alert indicating that the input button on the first device was pressed, the geographic location of the first device.

In one or more embodiments, the memory of the second device may store instructions that, when executed by the processor of the second device, cause the second device to: receive input adjusting the threshold distance; and determine, based on the short-range wireless connection, whether the distance between the first device and the second device is greater than the adjusted threshold distance.

In one or more embodiments, the first device may include a WiFi radio. In one or more embodiments, the memory of the first device may store instructions that, when executed by the processor of the first device, cause the first device to: receive, via the external USB interface or the WiFi radio, updated instructions that control operation of the first device; and store the updated instructions that control operation of the first device.

In one or more embodiments, the memory of the first device may store instructions that, when executed by the processor of the first device, cause the first device to: establish a USB connection or WiFi connection with the second device; and send, to the second device, a backup copy of information stored on the first device.

In one or more embodiments, the memory of the second device may store instructions that, when executed by the processor of the second device, cause the second device to: display, via an application, a map visually indicating the geographic location of the first device; receive, from the first device, an updated geographic location of the first device; and after receiving, from the first device, the updated geographic location of the first device, display, via the application, an updated map visually indicating the updated geographic location of the first device.

In one or more embodiments, the memory of the second device may store instructions that, when executed by the processor of the second device, cause the second device to: receive an input requesting to deactivate the alert indicating that the distance between the first device and the second device is greater than the threshold distance; and in response to receiving the input requesting to deactivate the alert indicating that the distance between the first device and the second device is greater than the threshold distance, determine whether the distance between the first device and the second device is less than the threshold distance. In one or more embodiments, the memory of the second device may store instructions that, when executed by the processor of the second device, cause the second device to: receive a second signal indicating that the input button on the first device was pressed; determine, based on the second signal indicating that the input button on the first device was pressed: whether a time of the second signal was after initiation of the alert indicating that the distance between the first device and the second device is greater than the threshold distance, and whether the time of the second signal was after determining that the distance between the first device and the second device is less than the threshold distance; based on determining that the time of the second signal was after the initiation of the alert indicating that the distance between the first device and the second device is greater than the threshold distance and after the determining that the distance between the first device and the second device is less than the threshold distance, deactivate the alert indicating that the distance between the first device and the second device is greater than the threshold distance.

In one or more embodiments, the first device may include a vibration element. In one or more embodiments, the memory of the first device may store instructions that, when executed by the processor of the first device, cause the first device to: receive a signal indicating that the distance between the first device and the second device is greater than the threshold distance; and in response to receiving the signal indicating that the distance between the first device and the second device is greater than the threshold distance, cause the vibration element to vibrate.

In one or more embodiments, the first device may include a heart-rate sensor. In one or more embodiments, the memory of the first device may store instructions that, when executed by the processor of the first device, cause the first device to: determine, via the heart-rate sensor, a heart rate of the user of the first device; and send, to the second device, the heart rate of the user of the first device.

In one or more embodiments, the system may include a third device associated with a vehicle. In one or more embodiments, the memory of the first device may store instructions that, when executed by the processor of the first device, cause the first device to: establish a connection between the first device and the third device associated with the vehicle; and send, to the second device, an indication of the connection between the first device and the third device associated with the vehicle. In one or more embodiments, the memory of the second device may store instructions that, when executed by the processor of the second device, cause the second device to: establish a connection between the second device and the third device associated with the vehicle; receive the indication of the connection between the first device and the third device associated with the vehicle; determine, based on the indication of the connection between the first device and the third device associated with the vehicle, whether the distance between the first device and the third device associated with the vehicle is less than the threshold distance; determine, based on the connection between the second device and the third device associated with the vehicle, a distance between the second device and the third device associated with the vehicle; determine, based on the distance between the second device and the third device associated with the vehicle, whether the distance between the second device and the third device associated with the vehicle is greater than the threshold distance; and based on determining that the distance between the first device and the third device associated with the vehicle is less than the threshold distance and that the distance between the second device and the third device associated with the vehicle is greater than the threshold distance, generate an alert indicating that the distance between the first device and the third device associated with the vehicle is less than the threshold distance and that the distance between the second device and the third device associated with the vehicle is greater than the threshold distance.

In one or more embodiments, the memory of the second device may store instructions that, when executed by the processor of the second device, cause the second device to: determine a geographic location of the second device; determine an outdoor temperature of the geographic location of the second device; determine whether the outdoor temperature of the geographic location of the second device is greater than a threshold temperature; based on determining that the outdoor temperature of the geographic location of the second device is greater than the threshold temperature, reduce the threshold distance; and in response to determining that the distance between the first device and the second device is greater than the reduced threshold distance, generate an alert indicating that the distance between the first device and the second device is greater than the reduced threshold distance.

In one or more embodiments, the memory of the second device may store instructions that, when executed by the processor of the second device, cause the second device to: determine a geographic location of the second device; determine an outdoor temperature of the geographic location of the second device; determine whether the outdoor temperature of the geographic location of the second device is greater than a threshold temperature; and generate an alert indicating that the outdoor temperature of the geographic location of the second device is greater than the threshold temperature.

In one or more embodiments, the system may include a home security device associated with a home. In one or more embodiments, the memory of the second device may store instructions that, when executed by the processor of the second device, cause the second device to: establish a connection between the second device and the home security device; receive, from the home security device, a signal that a door of the home was opened; in response to receiving the signal that the door of the home was opened, determine whether the distance between the first device and the second device is greater than the threshold distance; and in response to determining that the distance between the first device and the second device is greater than the threshold distance, generate an alert indicating that the distance between the first device and the second device is greater than the threshold distance and that the door of the home was opened.

One or more embodiments may include a system including a silicone band. The silicone band may be configured to be worn around a wrist of a user or an ankle of the user, the silicone band holding a waterproof housing with an external USB interface and/or an input button. The waterproof housing may contain a Wi-Fi radio, a short-range wireless device, a rechargeable battery configured to be rechargeable via the external USB interface, a processor, and/or memory. The memory may store instructions that, when executed by the processor, cause the device to: receive, via the input button, an indication that the input button on the silicone band was pressed; in response to receiving the indication that the input button on the silicone band was pressed, send, via the WiFi radio, a signal that the input button on the silicone band was pressed; receive, via the WiFi radio, geographic location information for the silicone band; and send, via the WiFi radio or via the short-range wireless device, the geographic location information for the silicone band.

In one or more embodiments, the system may include one or more computing devices. The one or more computing devices may include a processor and memory. The memory may store executable instructions that, when executed by the processor of the computing device, cause the computing device to: receive the signal that the input button on the silicone band was pressed; in response to receiving the signal that the input button on the silicone band was pressed, generate an alert indicating that the input button on the silicone band was pressed; receive the geographic location information for the silicone band; determine, based on the geographic location information for the silicone band, a geographic location of the silicone band; determine, based on the geographic location of the silicone band, whether the silicone band is outside a defined geographic boundary; in response to determining that the silicone band is outside the defined geographic boundary, generate an alert indicating that the silicone band is outside the defined geographic boundary; establish a short-range wireless connection with the silicone band; determine, based on the short-range wireless connection with the silicone band, whether a distance between the silicone band and the computing device is greater than a threshold distance; and in response to determining that the distance between the silicone band and the computing device is greater than the threshold distance, generate an alert indicating that the distance between the silicone band and the computing device is greater than the threshold distance.

In one or more embodiments, the memory of the one or more computing devices may store instructions that, when executed by the processor of the one or more computing devices, cause the one or more computing devices to: establish a short-range wireless connection with a vehicle; determine that the short-range wireless connection with the vehicle has terminated; based on determining that the short-range wireless connection with the vehicle has terminated, determine a distance between the silicone band and the computing device; and based on determining that the distance between the silicone band and the computing device is greater than the threshold distance, generate an alert indicating that the distance between the silicone band and the computing device is greater than the threshold distance.

One or more embodiments may include a method including: establishing, by a computing device, a connection between the computing device and a wearable device; determining, by the computing device and based on the connection between the computing device and the wearable device, whether a distance between the computing device and the wearable device is greater than a threshold distance; based on determining that the distance between the computing device and the wearable device is greater than the threshold distance, generating, by the computing device, an alert indicating that the distance between the computing device and the wearable device is greater than the threshold distance; receiving, by the computing device, a request to stop the alert indicating that the distance between the computing device and the wearable device is greater than the threshold distance; in response to receiving the request to stop the alert indicating that the distance between the computing device and the wearable device is greater than the threshold distance: determining whether the distance between the computing device and the wearable device is less than the threshold distance; and determining whether the computing device has received, while the distance between the computing device and the wearable device is less than the threshold distance, a signal indicating that an input button on the wearable device was pressed; and based on determining that the distance between the computing device and the wearable device is less than the threshold distance, and that the computing device has received, while the distance between the computing device and the wearable device is less than the threshold distance, the signal indicating that an input button on the wearable device was pressed, stopping, by the computing device, the alert indicating that the distance between the computing device and the wearable device is greater than a threshold distance.

In one or more embodiments, the method may include determining, by the computing device and based on a signal from a near-field communication (NFC) sensor of the computing device, that the computing device and the wearable device came into close proximity during pendency of the alert indicating that the distance between the computing device and the wearable device is greater than the threshold distance; and after receiving the indication that the computing device and the wearable device came into close proximity during pendency of the alert indicating that the distance between the computing device and the wearable device is greater than the threshold distance, stopping, by the computing device, the alert indicating that the distance between the computing device and the wearable device is greater than a threshold distance.

In one or more embodiments, the method may include receiving, by the computing device and from the wearable device, information indicating a WiFi network nearest to the wearable device; determining, by the computing device, a WiFi network nearest to the computing device; determining, by the computing device, whether the WiFi network nearest to the wearable device is different from the WiFi network nearest to the computing device; and based on determining that the WiFi network nearest to the wearable device is different from the WiFi network nearest to the computing device, generating, by the computing device, an alert indicating that the distance between the computing device and the wearable device may be greater than the threshold distance.

DESCRIPTION OF DRAWINGS

While multiple embodiments are disclosed, other embodiments will become apparent to one of skill in the art from the following detailed description, which describes illustrative embodiments of the disclosure. Therefore, the drawings and detailed description are to be regarded as illustrative in nature and not restrictive.

FIG. 5 depicts an illustrative system for tracking a wearable device, according to one or more embodiments described in this disclosure.

FIG. 16 depicts an illustrative flowchart of a system for tracking a wearable device, according to one or more embodiments described in this disclosure.

FIGS. 23A-23D depict illustrative user interfaces of alerts for tracking a wearable device, according to one or more embodiments described in this disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. Other embodiments may be utilized, and structural and functional modifications may be made, without departing from the scope of the present disclosure.

In one or more embodiments, child safety is enhanced through a distance monitoring bracelet. The bracelet may help a parent or caretaker locate a lost child in a store, track a child on a beach, playground, or the like. The bracelet may help a parent or caretaker prevent or resolve a child abduction or kidnapping. The bracelet may help a parent avoid leaving a child in a car. Thus, such a bracelet may help a parent or caretaker avoid a wide variety of potentially tragic situations by assisting a parent or caretaker in tracking a child.

The bracelet may be powered by a rechargeable battery, e.g., a battery that can be recharged using a USB cable, making the bracelet easy to charge at home and on the go. The bracelet may incorporate technology that includes GPS, a tracking system, WiFi connectivity, or cellular network connectivity. The bracelet may monitor health metrics, such as heart rate or oxygen levels.

The bracelet may interact with one or more apps on a smartphone, such as a smartphone of a parent or caretaker. The app may allow a parent or caretaker to track a location of the bracelet, adjust settings (e.g., a threshold distance), set a geo-fence perimeter, record historical locations of the bracelet, receive alerts, and the like. The app may allow a parent to view a real-time or historical image, video, or sound captured by the bracelet.

In one or more embodiments, the bracelet may trigger an alert on a device (e.g., smartphone) of the parent or caretaker if the bracelet leaves a safe-zone perimeter (e.g., a threshold distance from a device of the parent or caretaker). The bracelet and/or the device of the parent or caretaker may vibrate, or provide other indications of alarm, when the bracelet leaves the safe-zone perimeter. The alert on the device of the parent or caretaker might not allow deactivation until the parent or caretaker has returned to the child and pressed a button on the bracelet to deactivate the alert.

In one or more models, the parent or caretaker may be able to adjust the distance setting (e.g., for purchasing a bracelet for an older child (e.g., 11-17 years old)). In one or more embodiments, the bracelet may include a panic button that may be pressed in case of an unsafe situation (e.g., kidnapping). The panic button, when pressed, may send a signal to a device (e.g., smartphone) of a parent or caretaker. The signal may include a location of the bracelet.

Figure 1:
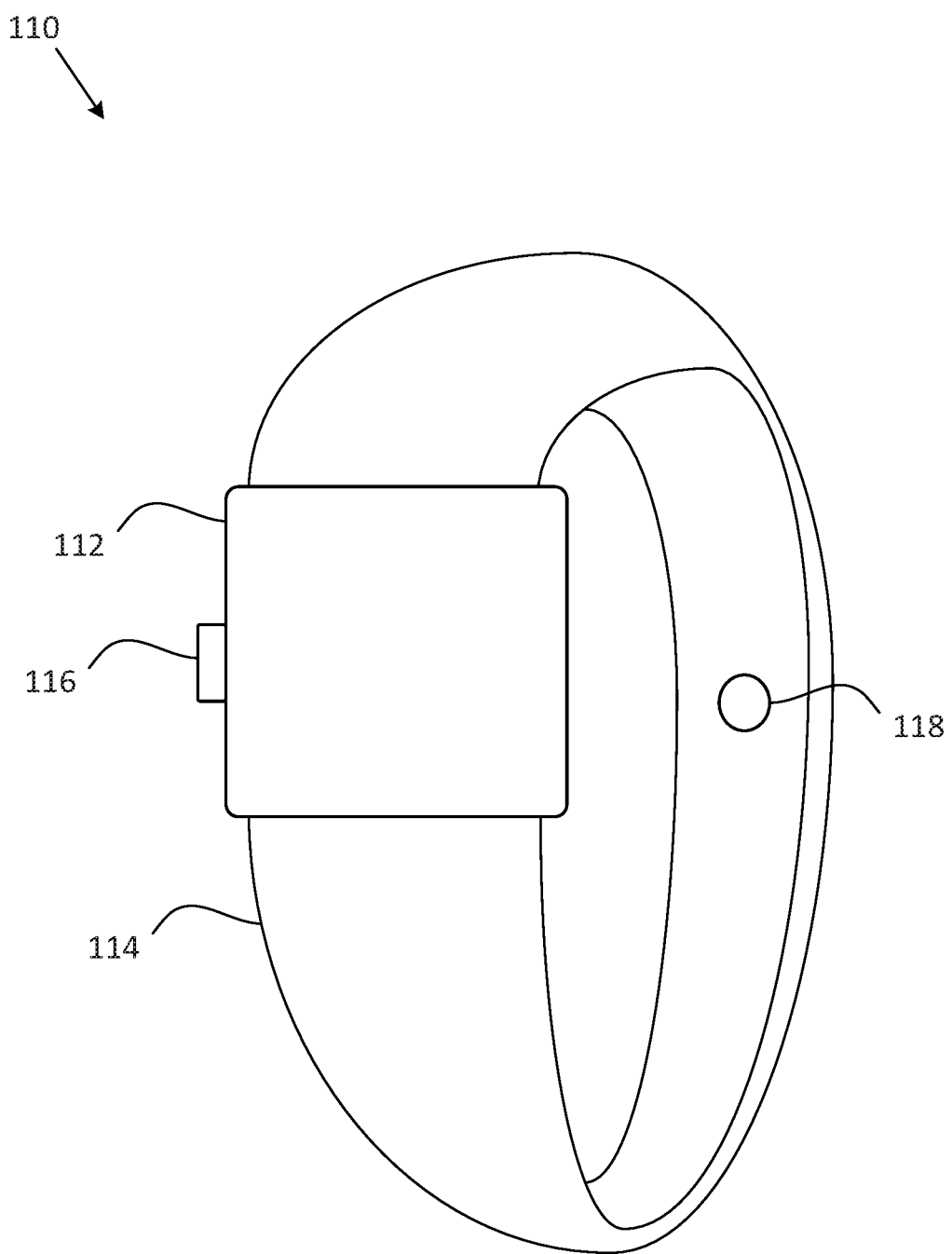
FIG. 1 depicts an illustrative wearable device, according to one or more embodiments described in this disclosure.

FIG. 1 depicts an illustrative wearable device (e.g., wearable device 110). Wearable device 110 may include housing 112, band 114, input button 116, securing element 118, and/or one or more additional elements.

Wearable device 110 may include housing 112. The housing may be waterproof. The housing may be made of a similar material as the band (e.g., silicone) or a different material. The housing may be made of metal (e.g., stainless steel, aluminum, titanium, steel, alloy), silicone, ceramic, wood, plastic, another material, or a combination of materials. The housing may contain one or more electronic elements (e.g., GPS device, cellular network device, short-range wireless device, processor, memory, battery, camera, microphone, NFC device, vibration element, heart-rate sensor, USB port, or the like).

Wearable device 110 may include band 114. Band 114 may be made of silicone, metal, wood, ceramic, plastic, another material, or a combination of materials. Band 114 may be wearable on a wrist or ankle, and may be adjustable to different wrist or ankle sizes. Band 114 may have a sleek design that can be worn every day, or for various occasions. Band 114 may be one or more colors. Band 114 may include the ability to add charms, buttons, or allergy tags. Band 114 may be waterproof or water resistant.

Wearable device 110 may include input button 116. Input button 116 may receive input from a user (e.g., a user wearing wearable device 110, or a different user not wearing wearable device 110). For example, if a child is wearing wearable device 110 and is separated from a parent or caretaker (e.g., the child is lost, left behind, abducted), the child may press input button 116 to trigger an alert on a computing device of the parent or caretaker. In another example, input button 116 may be used to deactivate an alert on the computing device of the parent or caretaker, once the parent or caretaker returns to the child wearing the wearable device. If the parent or caretaker receives an alert and returns to the child, then the parent or caretaker may press input button 116 to deactivate the alert on the computing device of the parent or caretaker. As explained below, the device may distinguish between various pushes of the input button (e.g., between those of a parent or caretaker, a child wearing the device, or others). For example, the alert on the computing device of the parent or caretaker might not deactivate unless the computing device of the parent or caretaker is within a threshold proximity of wearable device 116, which may prevent the child or abductor from simply pressing the input button 116 again to deactivate the alert after the alert has been activated. In this example, an unattended child could trigger an alert on the parent's computing device by pressing the input button 116. The parent could then deactivate the alert by pressing button 116 when the parent's computing device is sufficiently near device 110 as measured by circuitry within device 110. This allows the parent to deactivate alerts, but only after returning to the child. Still in this example, once an alert has been triggered by pressing button 116, subsequent presses of button 116 would not deactivate the alert unless the parent's computing device was sufficiently near the device 110 so as to authenticate the button press as having been performed by the parent or at the parent's direction.

Other techniques could be used to deactivate alerts as well. For example, device 110 may include additional components for distinguishing one user from another (e.g., for performing facial, retinal or voice recognition, or fingerprint identification) such that use of button 116 by a parent results in deactivation of alarms, whereas use of button 116 by others does not.

Wearable device 110 may include securing element 118. For example, securing element 118 may include a post, knob, lock, pin, hook, buckle, fastener, or similar physical element for detachably securing two portions of band 114 together, such that band 114 may be securely placed around a wrist, ankle, neck, or other body part of a user. Securing element 118 may be similar to a securing element used to fasten a watchband around a wrist of a user. Securing element 118 may be similar to a securing element used to fasten a necklace around a neck of a user. Securing element 118 may be similar to a securing element used to fasten an anklet around an ankle of a user. Securing element 118 may be used to secure band 114 around a bag, a car seat, a shoe, an article of clothing, or other item that may be carried or used by a user. One or more sensors may be configured to detect a change in securing element 118 (e.g., to trigger one or more alerts if securing element 118 is detached). Thus, a parent or caretaker of a child wearing wearable device may be alerted if wearable device 110 is removed.

Wearable device 110 may be used in other applications than for children or teenagers. For example, wearable device 110 may be worn by an individual with special needs, an elderly individual, a convicted individual, a pet, an animal, or another person or non-person. Wearable device 110 may be attached to valuable, sensitive, important, dangerous, or other materials (or packing or packaging thereof), and allow tracking or caretaking thereof.

Figure 2:
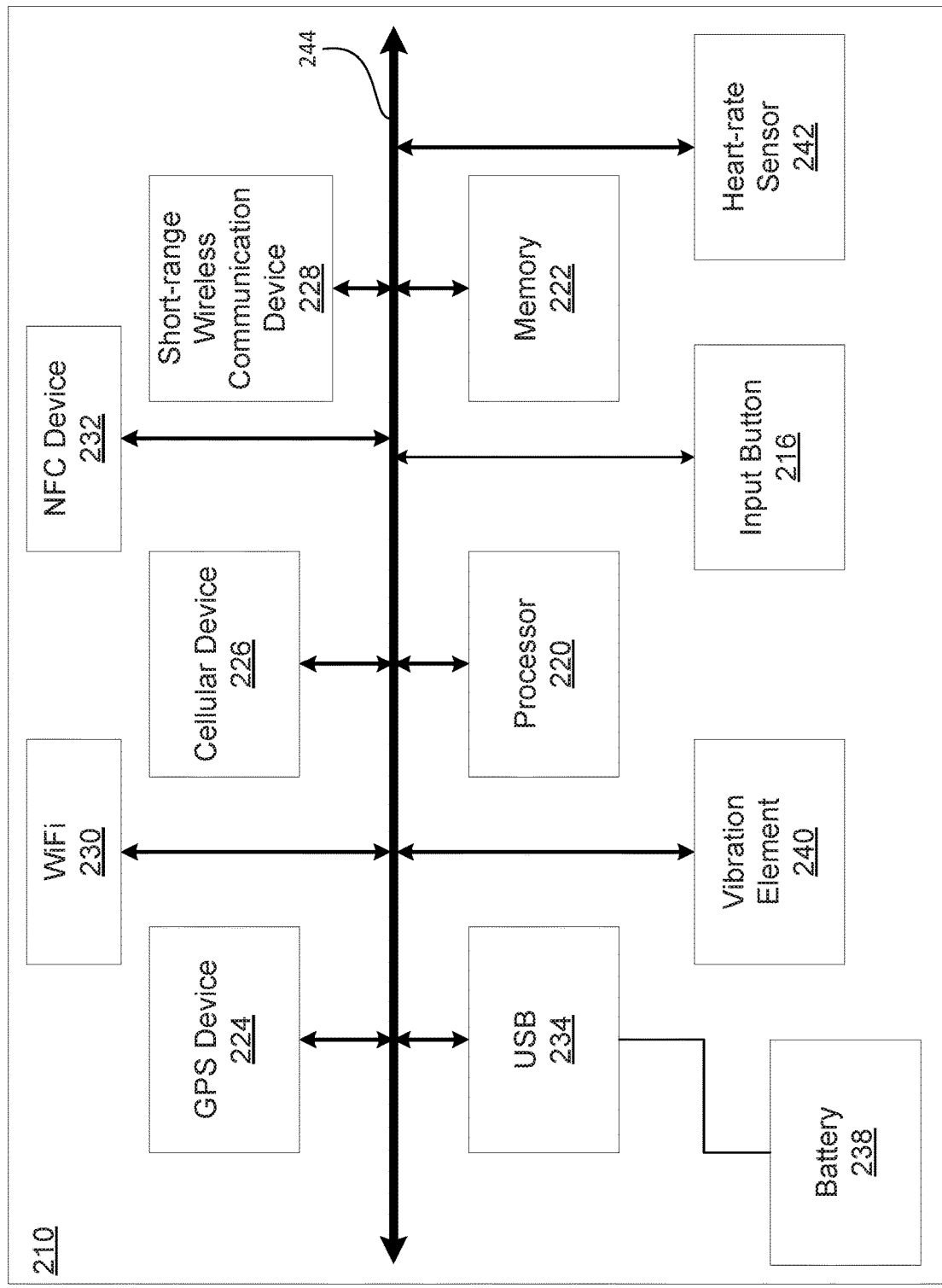
FIG. 2 depicts an illustrative block diagram of a wearable device, according to one or more embodiments described in this disclosure.

FIG. 2 depicts an illustrative block diagram of one or more embodiments of a wearable device (e.g., wearable device 210). In particular, FIG. 2 depicts electronic components that would typically reside within a waterproof housing 112, as generally depicted in FIG. 1.

Wearable device 210 may include one or more processors (e.g., processor 220). The one or more processors may be configured to execute one or more instructions that cause the processor to perform one or more functions described herein.

Wearable device 210 may include one or more memories (e.g., memory 222). The one or more memories may include different types of memory (e.g., SRAM, DRAM, flash), which may be used as cache memory, main memory, secondary memory, archival memory, or the like. The one or more memories may store instructions that, when executed by the one or more processors (e.g., processor 220), cause wearable device 210 to perform one or more functions described herein.

Wearable device 210 may include one or more input buttons (e.g., input button 216). Input button 216 may be similar to input button 116 described in connection with FIG. 1.

Wearable device 210 may include one or more location devices (e.g., GPS device 224). The location device may determine location information that may be used to determine a geographic location of wearable device 210. A location device may determine location information from satellite signals, cellular network signals, WiFi network signals, 5G network signals, BLUETOOTH signals, beacon signals, or a combination of one or more signal types.

Wearable device 210 may include one or more wireless network devices (e.g., WiFi device 230). The one or more wireless network devices may communicate with one or more wireless networks using one or more different protocols or channels. The one or more wireless network devices may be used alternatively based on a strength of nearby wireless networks, or based on a particular function being performed by wearable device 210. For example, if the strength of wireless signals received at device 210 is stronger for a first protocol than for a second protocol, then device 210 may enable a device 230 (or a portion of that device), which uses the first protocol, while temporarily disabling devices (or portions of such devices) which use other protocols. Doing so may save power within device 210. On the other hand, as explained further below, there may be situations in which it is advantageous to simultaneously enable communication over multiple protocols, e.g., cellular and WiFi. Software executed by processor 220 determines which wireless communications protocols to enable and disable depending on context. One or more wireless network devices may be used for communicating with one or more computing devices (e.g., a computing device of a parent or caretaker of a child wearing wearable device 210).

Wearable device 210 may include one or more cellular devices for communicating with one or more cellular networks (e.g., cellular device 226). The one or more cellular devices may enable communication over one or more cellular networks (e.g., a GSM network, a CDMA network, a 2G network, a 3G network, a 4G network, an LTE network, a WIMAX network, a 5G network). The one or more cellular devices may transmit data instead of or in addition to data transmitted via one or more other devices (e.g., WiFi device 230, short-range wireless communication device 228).

Wearable device 210 may include one or more "near field communication" ("NFC"), or radio-frequency identification (RFID), devices (e.g., NFC device 232). For example, NFC device 232 may include an NFC tag, an NFC sensor, an NFC peer-to-peer device, or the like. NFC device 232 may allow wearable device 210 to quickly pair with a computing device (e.g., a computing device of a parent or caretaker of a child wearing wearable device 210). NFC device 232 may allow a parent or caretaker to disable an alert on the computing device of the parent or caretaker by confirming that the parent or caretaker is nearby the child wearing wearable device 210. For example, NFC device 232 can determine whether the parent's computing device (e.g., smartphone) is in close proximity to the device 210. Device 210 may deactivate alerts when button 216 is pressed while NFC device 232 confirms close proximity of the parent's computing device and might not deactivate alarms in response to button presses when the parent's computing device is not in close proximity to device 210.

Wearable device 210 may include one or more short-range wireless communication devices (e.g., short-range wireless communication device 228). Such "short-range" devices typically have longer ranges than NFC device 232, but are nonetheless conventionally known as short-range devices. For example, a short-range wireless communication device 228 may include one or more BLUETOOTH devices, BLUETOOTH Low Energy (BLE) devices, iBeacon devices, ultra-wideband (UWB) devices, Zigbee devices, Z-wave devices, infrared devices, or the like.

Wearable device 210 may include one or more ports (e.g., USB port 234). One or more ports may provide an interface for downloading information from wearable device 210. One or more ports may provide an interface for loading information (e.g., software or firmware updates) onto wearable device 210. One or more ports may provide an interface for recharging one or more batteries of wearable device 210.

Wearable device 210 may include one or more batteries (e.g., battery 238). One or more batteries may be replaceable. One or more batteries may be rechargeable (e.g., via USB port 234, via inductive charging, via Qi charging, or the like).

Wearable device 210 may include one or more vibration elements (e.g., vibration element 240). Vibration element 240 may provide tactile feedback to a user (e.g., in response to a button press or series of button presses). Vibration element 240 may vibrate in response to one or more alerts. A vibration pattern may correspond to a particular message type (e.g., a first type of alert may correspond to a first vibration pattern, and a second type of alert may correspond to a second vibration pattern).

Wearable device 210 may include one or more heart-rate sensors (e.g., heart-rate sensor 242). Heart-rate sensor 242 may determine a heart rate of a user of wearable device 210 (e.g., a heart rate of a child wearing wearable device 210). The heart rate may be transmitted to a computing device (e.g., a computing device of a parent or caretaker of a child wearing wearable device 210). The heart rate may be used to generate one or more alerts (e.g., via wearable device 210, via the computing device of the parent or caretaker). For example, if a child is lost, left behind, abducted, hurt, nervous, scared, experiencing a medical emergency, or the like, the child's heart rate may be different from a typical heart rate. In response, the parent or caretaker may receive an alert via the computing device of the parent or caretaker. The alert may be triggered based on a signal from wearable device 210, the signal including the heart rate of the user of the wearable device 210, the heart rate having been determined by heart-rate sensor 240.

Wearable device 210 may include one or more buses (e.g., bus 244). Bus 244 may provide electronic communication between components within wearable device 210.

Wearable device 210 may include one or more additional components (e.g., temperature sensor, humidity sensor, camera, microphone, speaker), which may be utilized in combination with or enable one or more additional features described herein. For example, a temperature sensor may trigger an alert (e.g., in response to a child wearing wearable device 210 being left unattended in a vehicle and the temperature sensor detecting a temperature above a threshold temperature).

Figure 3:
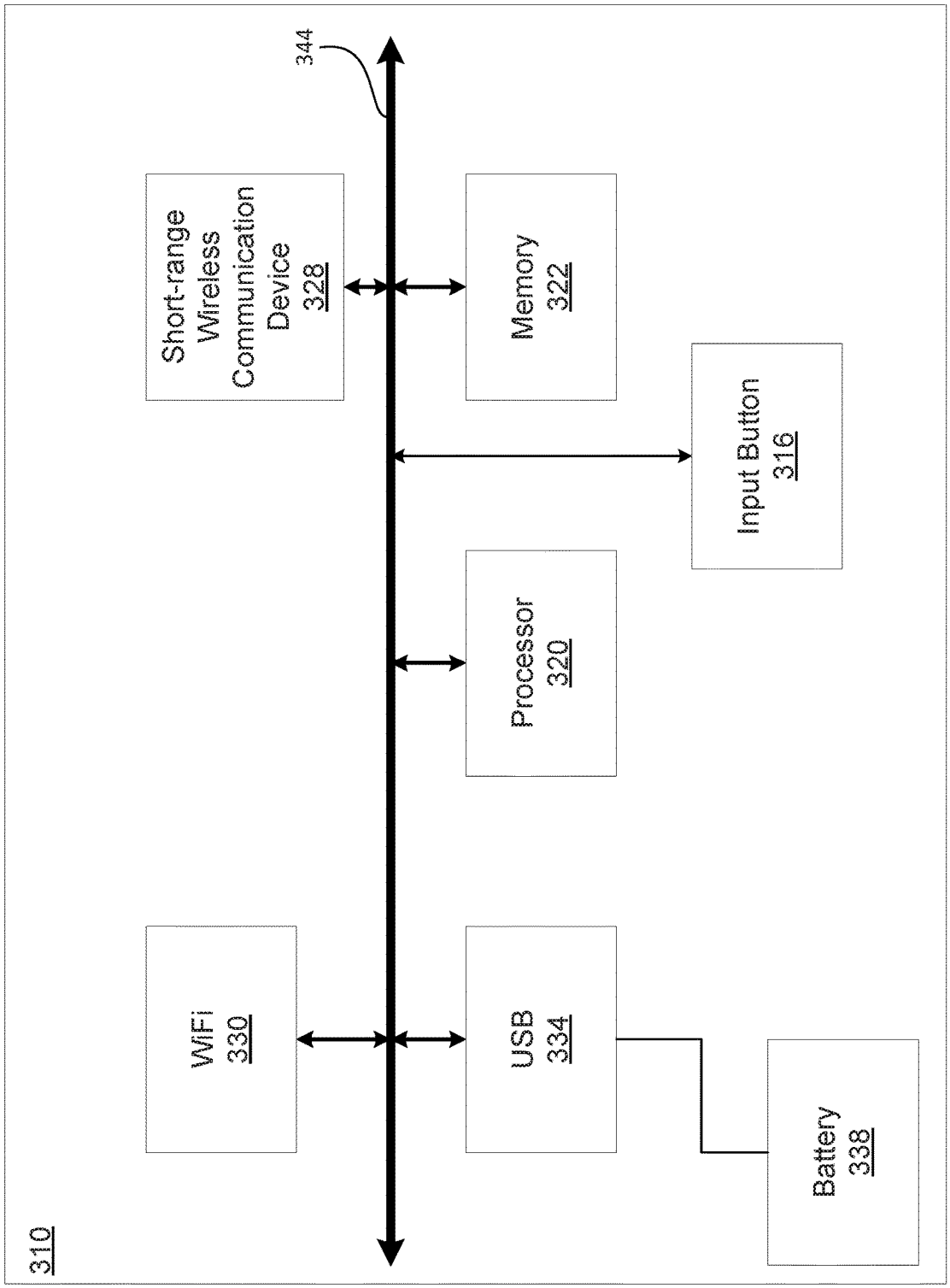
FIG. 3 depicts an illustrative block diagram of a wearable device, according to one or more embodiments described in this disclosure.

FIG. 3 depicts an illustrative block diagram of one or more embodiments of a wearable device (e.g., wearable device 310). One or more embodiments of the wearable device may include fewer features to allow the wearable device to be sold at a lower price point than a model with more features. One or more features (e.g., hardware features, software features) may be similar to one or more other features (e.g., features depicted in connection with wearable device 210 depicted in FIG. 2). The features depicted as part of wearable device 310 are merely illustrative, and wearable device 310 might include more or fewer features than wearable device 210. Wearable device 310 might include one or more other features not depicted in connection with wearable device 210 or with wearable device 310. Wearable device 310 might not include one or more features depicted in FIG. 3.

Wearable device 310 may include one or more processors (e.g., processor 320), which may be similar to the one or more processors described in connection with wearable device 210.

Wearable device 310 may include one or more memories (e.g., memory 322), which may be similar to the one or more memories described in connection with wearable device 210.

Wearable device 310 may include one or more input buttons (e.g., input button 316), which may be similar to the one or more input buttons described in connection with wearable device 210.

Wearable device 310 may include one or more wireless network devices (e.g., WiFi device 330), which may be similar to the one or more wireless network devices described in connection with wearable device 210.

Wearable device 310 may include one or more short-range wireless communication devices (e.g., short-range wireless communication device 328), which may be similar to the one or more short-range wireless communication devices described in connection with wearable device 210.

Wearable device 310 may include one or more ports (e.g., USB port 334), which may be similar to the one or more ports described in connection with wearable device 210.

Wearable device 310 may include one or more batteries (e.g., battery 338), which may be similar to the one or more batteries described in connection with wearable device 210.

Wearable device 310 may include one or more buses (e.g., bus 344), which may be similar to the one or more buses described in connection with wearable device 210.

Wearable device 310 may include one or more additional components, which may be similar to one or more components described in connection with wearable device 210.

Figure 4:
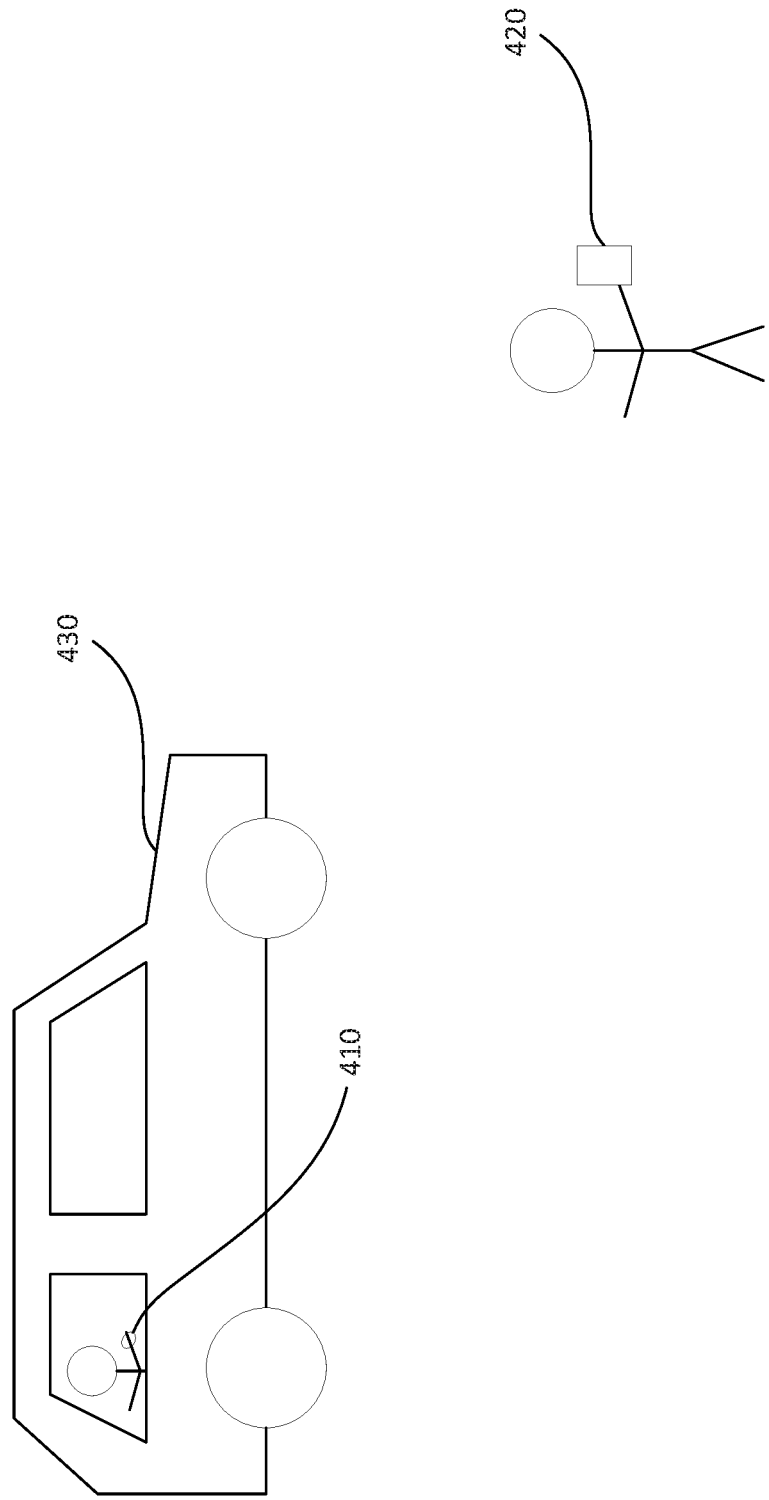
FIG. 4 depicts an illustrative system for tracking a wearable device, according to one or more embodiments described in this disclosure.

FIG. 4 depicts a system for tracking a wearable device, in accordance with one or more embodiments. A system may include a wearable device (e.g., wearable device 410), which may be similar to one or more wearable devices described herein (e.g., wearable device 110, wearable device 210, wearable device 310). The wearable device may be worn by a child, such as on a wrist or ankle of the child.

A system may include a computing device 420 (e.g., a smartphone), which may be a computing device used by a parent or caretaker of the child wearing the wearable device. The wearable device may be trackable by the computing device, such as a smartphone, mobile phone, laptop, tablet, or other device. The computing device may include one or more processors and one or more memories storing computer-readable instructions that, when executed by the one or more processors, causes the computing device to perform one or more functions described herein. For example, computing device may execute one or more applications that allow the parent or caretaker to track information about a child who is wearing the wearable device, e.g., the child's location, heart rate, and the ambient temperature around the child. The one or more applications may be similar to the application described elsewhere herein.

The system may interact with a computing device associated with a vehicle (e.g., vehicle 430). Vehicle 430 may communicate with wearable device 410 and/or computing device 420. The computing device associated with the vehicle may include one or more processors and one or more memories storing computer-readable instructions that, when executed by the one or more processors, cause the computing device associated with the vehicle to perform one or more functions described herein.

The wearable device may be associated with the application or computing device. For example, when setting up the wearable device, the wearable device may be paired with the computing device. Alternatively or additionally, the wearable device may be associated with an online account, which may allow a user to track one or more wearable devices associated with the online account using one or more computing devices associated with the online account. A user of the online account (e.g., a parent or caretaker) may input settings to the online account to associate one or more wearable devices with a particular user (e.g., a child). The user of the online account may input settings to the online account to indicate which device or devices should be used for interacting with the online account or another device (e.g., a wearable device).

The online account may include one or more security features to prevent nefarious registrations. For example, once a device (e.g., a wearable device, a computing device of a parent or caretaker) has been associated with a first online account, the device might not be permitted to be associated with a different online account (or might require permission from the first online account before being added to the different online account). In this manner, registrations of online accounts by nefarious individuals (e.g., kidnappers) may be prevented.

Multiple computing devices may be configured to track the same wearable devices. For example, both parents of a child may each have their own smartphone that is configured to track the same child. As another example, parents and day care workers could also each have their own smartphone configured to track the same child or children, each child having their own wearable device. In one configuration, anyone who has configured their smartphone via the online account to track a particular wearable device would receive all alerts associated with that device. In another configuration, various smartphones can be designated as primary, secondary, tertiary, and the like. For example, if both parents of a child have configured their smartphones to track the child's wearable device, one parent may designate their smartphone as primary and the other parent may designate their smartphone as secondary. The primary phone would initially receive all alerts associated with the wearable device. Only if the primary phone did not respond to alerts within a designated time would alerts be conveyed to the secondary phone. This configuration may be convenient, for example, if one parent or caretaker is at work or running errands while another parent or caretaker is watching a child or children. The parents and/or caretakers can adjust their designation as, e.g., primary or secondary via the on-line system as desired to accommodate changes in their roles. For example, a parent may change their status to secondary when going to work and then change their status to primary when returning from work. Two or more devices could simultaneously be designated primary, e.g., when both parents and the child are home or when all have gone shopping together. Alternatively, the computing device for each parent or caretaker and the wearable device may prompt the respective parent or caretaker to indicate whether that parent or caretaker is currently taking care of a particular child, or may automatically determine that the parent or caretaker is taking care of the particular child based on the geographic location of the computing device of the parent or caretaker being closer to a geographic location of the wearable device worn by the child than a geographic location of a different computing device of a different parent or caretaker. In this way, multiple parents or caretakers can seamlessly care for a child or children without needing to readjust settings for the online account each time one or the other parent or caretaker is taking care of the child or children.

When a parent or caretaker departs vehicle 430, and if a child wearing wearable device 410 is left behind in vehicle 430, then the parent or caretaker may receive an alert on computing device 420. Computing device 420 may alert the parent or caretaker based on the computing device being more than a threshold distance from wearable device 410. Computing device 420 might automatically adjust the threshold distance based on weather factors (e.g., if the temperature is extremely high or extremely low, computing device might reduce the threshold distance). If the parent or caretaker attempts to turn off the alert on computing device 420, the alert might not deactivate until the parent or caretaker returns to the vehicle and presses a button on wearable device 410 while in close proximity to wearable device 410. In this manner, a parent or caretaker can avoid forgetting a child in a vehicle and thereby avoid a potentially tragic situation (e.g., leaving a child in a hot vehicle).

If a parent or caretaker does not return to vehicle 430 within a threshold amount of time, computing device 420 may take one or more additional actions. For example, computing device 420 may provide a different type of alert, a different intensity of alert (e.g., increase a volume, increase a brightness, increase a vibration intensity).

Alternatively or additionally, computing device 420 may send a signal to vehicle 430 that causes vehicle 430 to take one or more actions (e.g., open a window a certain amount (e.g., one or two inches)), sound a car alarm, remote start and activate a comfort control system (e.g., an air conditioning system, a heater). The one or more actions computing device 420 commands vehicle to take may be dependent on one or more factors (e.g., if outside temperature is between 60-75 degrees Fahrenheit, computing device 420 may command vehicle 430 to open a window; if outside temperature is greater than 75 degrees Fahrenheit, computing device 420 may command vehicle 430 to turn on an air conditioning system; if outside temperature is less than 60 degrees Fahrenheit, computing device 420 may command vehicle 430 to turn on a heater). As yet another alternative, the wearable device may place a 911 call seeking emergency assistance if an alert is not responded to by the parents or caretakers within a threshold amount of time, as determined by software running on the wearable device.

FIG. 5 depicts a system for tracking a wearable device, in accordance with one or more embodiments. A system may include a wearable device (e.g., wearable device 510), which may be similar to one or more wearable devices described herein (e.g., wearable device 110, wearable device 210, wearable device 310, wearable device 410). The system may include a computing device (e.g., computing device 520), which may be similar to one or more computing devices described herein (e.g., computing device 420). The computing device may execute one or more applications, such as an application for tracking a wearable device, as described herein.

The system may interact with one or more home security system devices (e.g., home security device 540), such as a door sensor, window sensor, motion sensor, perimeter sensor, laser sensor, camera, lock, or the like. The home security system may be associated with one or more computing devices including one or more processors and one or more memories storing computer-readable instructions that, when executed by the one or more processors, cause the home security system to perform one or more functions described herein.

As an example, in some situations a parent may simply want to know that their child is somewhere within their home. As long as the child is within the home, the child can be considered safe. But the parent would want to receive an alert if there were any indications that the child had exited the home. Such alerts can be advantageously generated in a variety of ways. For example, a home security device (e.g., home security device 540) may send a signal to a computing device (e.g., computing device 520) indicating that a home security event occurred. For example, if a door sensor indicates that a door was opened, or if a window sensor indicates that a window was opened, the home security device may send an alert to the computing device. In response, computing device may determine a distance from a wearable device. If a computing device is otherwise waiting for a period of time before re-determining a distance between the computing device and a wearable device, the signal from the home security device may trigger the computing device to re-determine the distance immediately, rather than waiting for the remainder of a waiting period. Thus, if a child or other user wearing the wearable device left a home unexpectedly, the computing device may alert the parent or caretaker earlier than the parent or caretaker might otherwise be alerted.

In response to the signal from the home security device, the computing device may request one or more additional data from the wearable device. For example, the computing device may request the wearable device to provide an ambient temperature or ambient humidity to the computing device. If the ambient temperature or ambient humidity around the wearable device is different from the ambient temperature or ambient humidity around the computing device (or different within a threshold difference level), the computing device may generate an alert. Thus, if the child or other user wearing the wearable device went outside, and the ambient temperature or humidity is different outside than inside the house, then the wearable device may provide this information to the parent or caretaker. Triggering the check based on the home security device may assist in power savings for the wearable device and the computing device, since the check might not otherwise be performed if both the wearable device and the computing device are located within the home (e.g., if both the parent or caretaker and the child are in the home).

As another example, the parent may designate geographical boundaries, e.g., a boundary around the home, and may receive an alert whenever the wearable device detects that it has moved beyond the designated geographical boundary.

Figure 6:
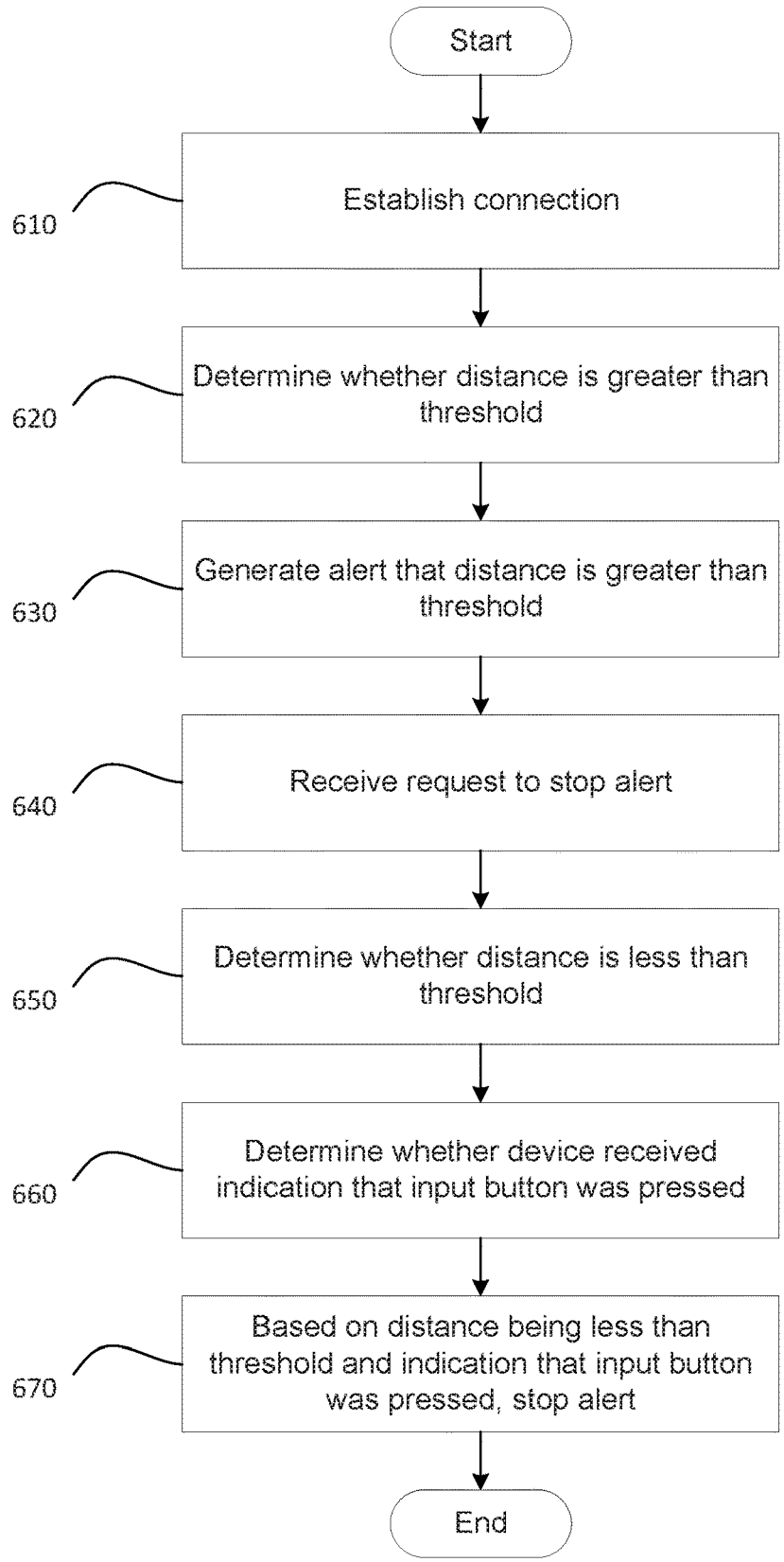
FIG. 6 depicts an illustrative flowchart of an algorithm for tracking a wearable device, according to one or more embodiments described in this disclosure.

FIG. 6 depicts an illustrative flowchart of an algorithm for a system to track a wearable device, in accordance with one or more embodiments.

In step 610, a computing device (e.g., computing device 420, computing device 520) may establish a connection between the computing device and a wearable device.

In step 620, the computing device may determine, based on the connection between the computing device and the wearable device, whether a distance between the computing device and the wearable device is greater than a threshold distance. For example, the computing device may determine, based on a short-range wireless connection (e.g., iBeacon, BLE) with the wearable device, a distance between the computing device and the wearable device. As another example, the computing device may determine the distance between the computing device and the wearable device based on a WiFi connection between the computing device and the wearable device, based on GPS positioning of the computing device and GPS positioning of the wearable device, based on ultra-wideband (UWB) radio signals between the computing device and the wearable device, or the like. The computing device may determine the distance between the computing device and the wearable device using a combination of techniques.

If the distance between the computing device and the wearable device is less than a threshold distance, the computing device may wait a period of time (e.g., 1 second, 10 seconds, 20 seconds, 30 seconds, 40 seconds, 50 seconds, 1 minute, 90 seconds, 2 minutes, 2½ minutes, 3 minutes, 4 minutes, 5 minutes, 10 minutes, or another period), then determine an updated distance between the computing device and the wearable device. If the computing device is constantly re-determining the distance between the computing device and the wearable device, a battery of the computing device and/or a battery of the wearable device might lose charge more quickly than would be desirable. If the computing device waits too long, however, before re-determining the distance between the computing device and the wearable device, the computing device might be undesirably far from the wearable device before generating an alert. Therefore, the waiting period between re-determining the distance between the computing device and the wearable device may be adjustable (e.g., via an application), by a user or automatically, so as to balance power efficiency and performance, which are priorities that may differ between users. A period of time between re-determining the distance may differ based on one or more factors (e.g., if an outdoor temperature is higher than a heat threshold or colder than a cold threshold, the time between re-determining may be shorter than if the outdoor temperature is below a heat threshold or above a cold threshold).

In step 630, the computing device may, based on determining that the distance between the computing device and the wearable device is greater than the threshold distance, generate an alert indicating that the distance between the computing device and the wearable device is greater than the threshold distance.

In step 640, the computing device may receive a request to stop the alert.

In step 650, the computing device may, in response to receiving the request to stop the alert, redetermine the distance between the computing device and the wearable device. The computing device may determine whether the redetermined distance between the computing device and the wearable device is less than the threshold distance. Alternatively or additionally, the computing device may determine, using a second communication protocol (e.g., NFC), whether the computing device is in proximity to the wearable device.

Alternatively or additionally, in step 660, the computing device may, in response to receiving the request to stop the alert, determine whether the computing device has received, while the distance between the computing device and the wearable device is less than the threshold distance, a signal indicating that an input button on the wearable device was pressed.

In step 670, the computing device may, based on determining that the redetermined distance between the computing device and the wearable device is less than the threshold distance, and based on the computing device having received, while the distance between the computing device and the wearable device is less than the threshold distance, the signal indicating that an input button on the wearable device was pressed, stop the alert on the computing device. By stopping the alert after determining that the computing device and the wearable device are in close proximity (e.g., within the threshold distance), the system can avoid stopping the alert prematurely or based on illegitimate button presses (e.g., the child or an abductor pressing the input button on the wearable device will not stop the alert on the parent's device unless the parent is nearby the child). The system can also avoid a parent or caretaker ignoring or deactivating the alert if the parent or caretaker has left the child in a vehicle, since the parent or caretaker cannot deactivate the alert unless the parent or child returns to the child first.

Figure 7:
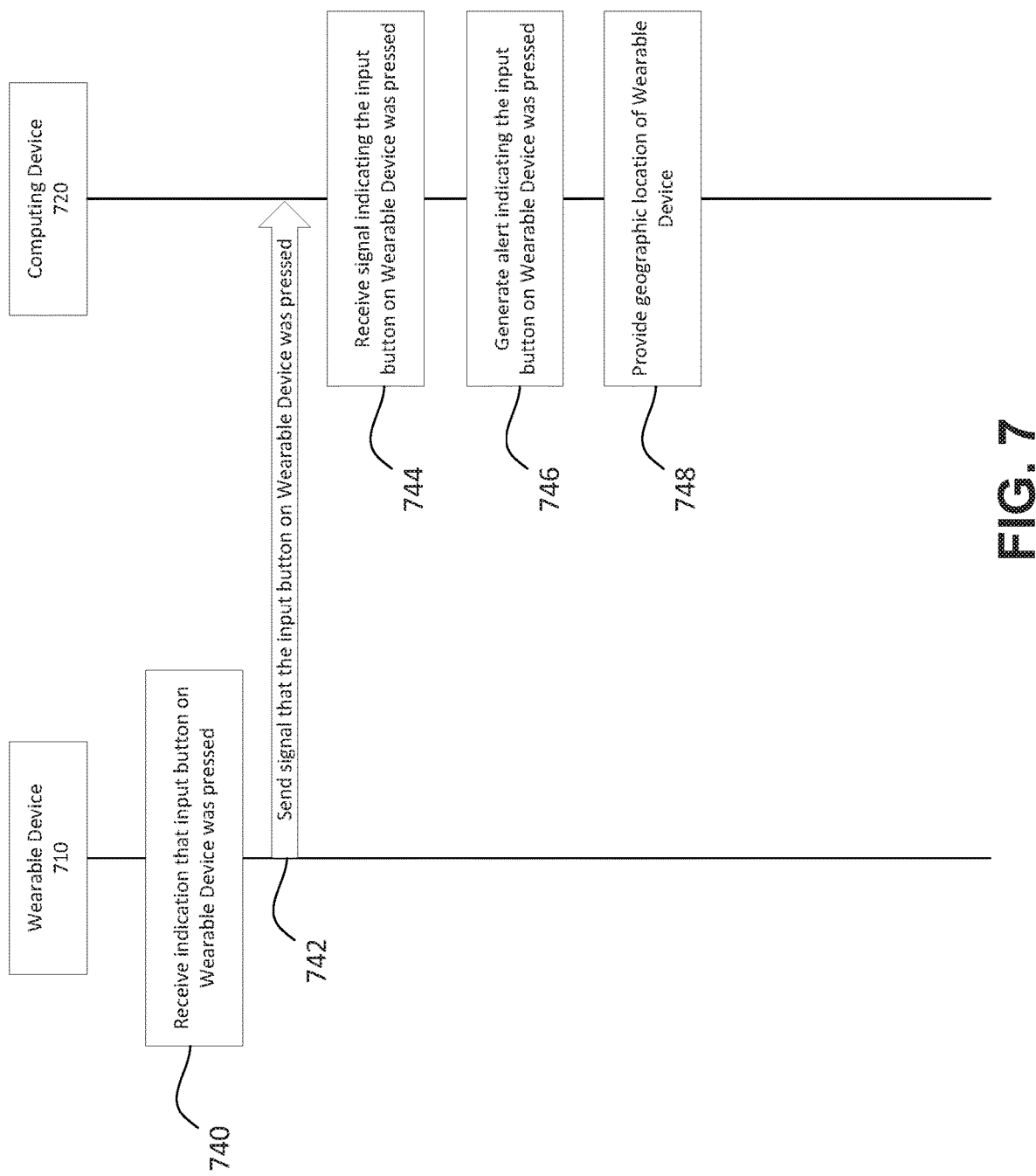
FIG. 7 depicts an illustrative flowchart of a system for tracking a wearable device, according to one or more embodiments described in this disclosure.

FIG. 7 depicts an illustrative system flow diagram of a system for tracking a wearable device, in accordance with one or more embodiments. One or more steps may be omitted, and one or more additional steps other that those depicted may be included.

Computing device 720 may interact with wearable device 710. Wearable device 710 may be similar to one or more other wearable devices described herein (e.g., wearable device 110, wearable device 210, wearable device 310, wearable device 410, wearable device 510). Computing device 720 may be similar to one or more other computing devices described herein (e.g., computing device 420, computing device 520).

In one or more instances, a child may press an input button of a wearable device when the child is separated from a parent or caretaker (e.g., the child is lost, the parent or caretaker leaves the child in a vehicle, the child is abducted), and wearable device responsively sends a signal to a computing device, such as a smartphone, of the parent or caretaker. The computing device of the parent or caretaker may display a responsive alert indicating that the child pressed the input button, and may also provide a geographic location of the wearable device.

In step 740, wearable device 710 may receive an indication that an input button on wearable device 710 was pressed. Wearable device 710 may receive the indication via the input button on wearable device 710. For example, a child may press the input button on wearable device 710.

In step 742, wearable device 710 may, in response to receiving the indication that the input button on wearable device 710 was pressed, send a signal that the input button on wearable device 710 was pressed. For example, wearable device 710 may send the signal via a cellular network radio (e.g., cellular device 226), a WiFi device (e.g., WiFi device 230), a short-range wireless communication device (e.g., short-range wireless communication device 228), an NFC device (e.g., NFC device 232), or the like. In one or more embodiments, wearable device 710 may send the signal via more than one channel, to account for the possibility that the signal might not make it via one of the channels.

In step 744, computing device 720 may receive the signal that the input button on wearable device 710 was pressed. For example, computing device 720 may receive the signal via a cellular network radio (e.g., cellular device 226), a WiFi device (e.g., WiFi device 230), a short-range wireless communication device (e.g., short-range wireless communication device 228), an NFC device (e.g., NFC device 232), an Ethernet device, or the like. Computing device 720 may receive the signal over a network (e.g., cellular network, local area network, wide area network, the Internet) or directly from wearable device 710.

In step 746, computing device 720 may, in response to receiving the signal that the input button on wearable device 710 was pressed, generate an alert indicating that the input button on wearable device 710 was pressed. For example, computing device 720 may generate an audible alert, a text alert, a video alert, a vibration alert, or the like. Computing device 720 may provide the alert via phone call, email, text message, multimedia message, an application, a popup, or the like. Computing device 720 may trigger one or more other devices to provide an alert in addition to or instead of computing device 720. For example, an alert might be triggered on a secondary device, a tertiary device, or another device, which may or might not be associated with an online account that the wearable device is associated with. Thus, if the alert on the computing device of a first parent or caretaker is not received or not responded to, an alert on another device (e.g., of a second parent or caretaker) may provide additional notifications. As another example, a vehicle alarm may sound if an alert on the computing device of a parent or caretaker is not responded to in an adequate time period (e.g., if a parent or caretaker leaves a child in a vehicle, and does not return to the vehicle in response to an alert on the parent or caretaker's smartphone, the vehicle alarm may sound after a time).

In step 748, computing device 720 may, in response to receiving the signal that the input button on wearable device 710 was pressed, provide, with the alert indicating that the input button on wearable device 710 was pressed, the geographic location of wearable device 710.

Figure 8:
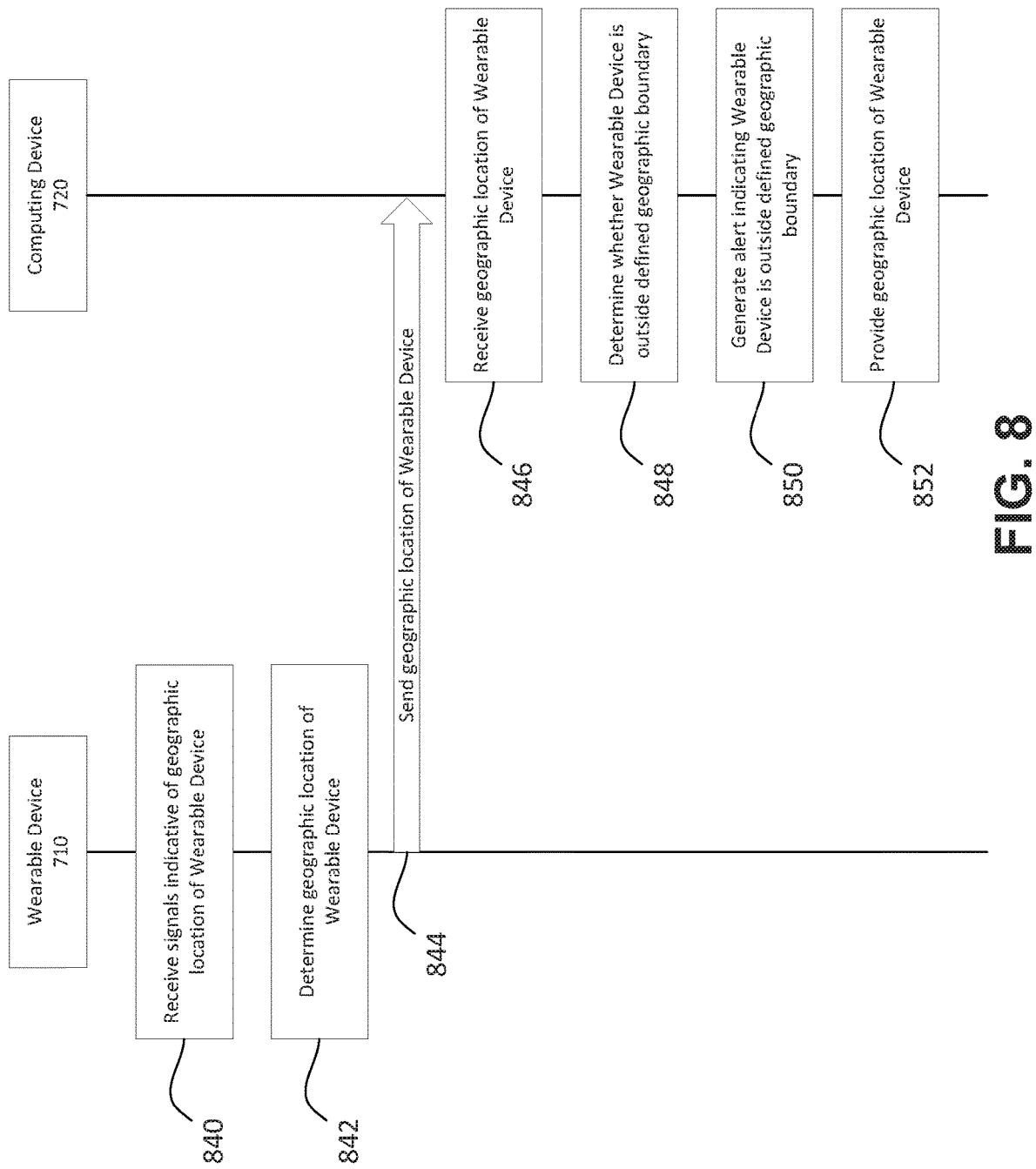
FIG. 8 depicts an illustrative flowchart of a system for tracking a wearable device, according to one or more embodiments described in this disclosure.

FIG. 8 depicts an illustrative system flow diagram for determining a geographic location of a wearable device, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a parent or caretaker may define a geographic boundary, such as a geo-fence, and receive an alert if the child leaves the geographic boundary. For example, a parent may define a geographic boundary around a home, a yard, a school, a neighborhood, or the like. If the child wearing a wearable device leaves the geographic boundary, or crosses a geographic line, the parent may receive an alert, which may include a notification of the geographic location of the child's wearable device. Alternatively or additionally, the parent may set a threshold distance between the wearable device and the parent's computing device such that an alert will be generated on the parent's device whenever the wearable device is too far away.

In step 840, wearable device 710 may receive signals indicative of a geographic location of wearable device 710. For example, wearable device 710 may receive GPS signals, WiFi signals, cellular network signals, IP signals, and/or other signals that may be used to determine a geographic location.

In step 842, wearable device 710 may determine, based on the signals indicative of the geographic location of wearable device 710, the geographic location of wearable device 710. For example, in step 840 the wearable device 710 may receive signals from GPS satellites and may extract geographic location information of the device from those satellite signals. As another example, wearable device 710 may detect one or more nearby WiFi signals, and use a WiFi positioning system for determining a geographic location of wearable device 710. As another example, wearable device 710 may detect cellular network signals, and determine a location based on signal strengths of one or more cells of the cellular network or by otherwise receiving location information from the cellular network. In one or more embodiments, wearable device 710 may use a combination of techniques for determining a geographic location of wearable device 710.

In step 844, wearable device 710 may transmit the geographic location of wearable device 710 to computing device 710. The manner in which this transmission is made can depend on the current communication status between the wearable device and the computing device. For example, if they are both connected to the same WiFi network, the transmission of geographic information may be made via WiFi. On the other hand, if they are not on the same WiFi network, then other modes of transmission, e.g., cellular, may be used. Software running on the wearable device may determine which mode of communication to use.

In step 846, computing device 720 may receive the geographic location of wearable device 710.

In step 848, computing device 720 may determine, based on the geographic location of wearable device 710, whether wearable device 710 is outside a defined geographic boundary. For example, a geo-fence may have been established (e.g., received via input to an application, such as an application executing on computing device 720). Computing device 720 may determine whether the geo-fence has been crossed. A geo-fence may be established, for example, around a house, a yard, a playground, a beach, a swimming pool, a school, a school yard, a church, a friend's house, or another location.

In step 850, computing device 720 may, in response to determining that wearable device 710 is outside the defined geographic boundary or is simply too far away, generate an alert. The alert may be similar to the alert described in connection with step 746. Alternatively or additionally, computing device 720 may, in response to determining that wearable device 710 has crossed the defined geographic boundary, generate an alert indicating that wearable device 710 has crossed the defined geographic boundary. In this manner, a parent or caretaker may be notified if a child wearing wearable device 710 crosses a defined geo-fence. Depending on one or more settings of wearable device 710, of computing device 720, and/or of an online account that wearable device 710 and/or computing device 720 is associated with, a parent or caretaker might or might not be able to disable the alert without finding the child and bringing computing device 720 within proximity of wearable device 710.

In step 852, computing device 720 may provide the geographic location of wearable device 710 (e.g., to a parent or caretaker using computing device 720). For example, computing device 720 may provide the geographic location of wearable device 710 with the alert indicating that wearable device 710 is outside the defined geographic boundary, or in a different alert. Alternatively or additionally, computing device 720 may display the geographic location of wearable device 710 via an application, such as an application including a user interface (e.g., user interface 2220), such as the user interface depicted in FIG. 22. Thus, a parent or caretaker who receives an alert that a child wearing wearable device 710 has left a defined geographic boundary may also receive, with the alert, a geographic location of the child, to enable the parent or caretaker to track and quickly locate the child.

Figure 9:
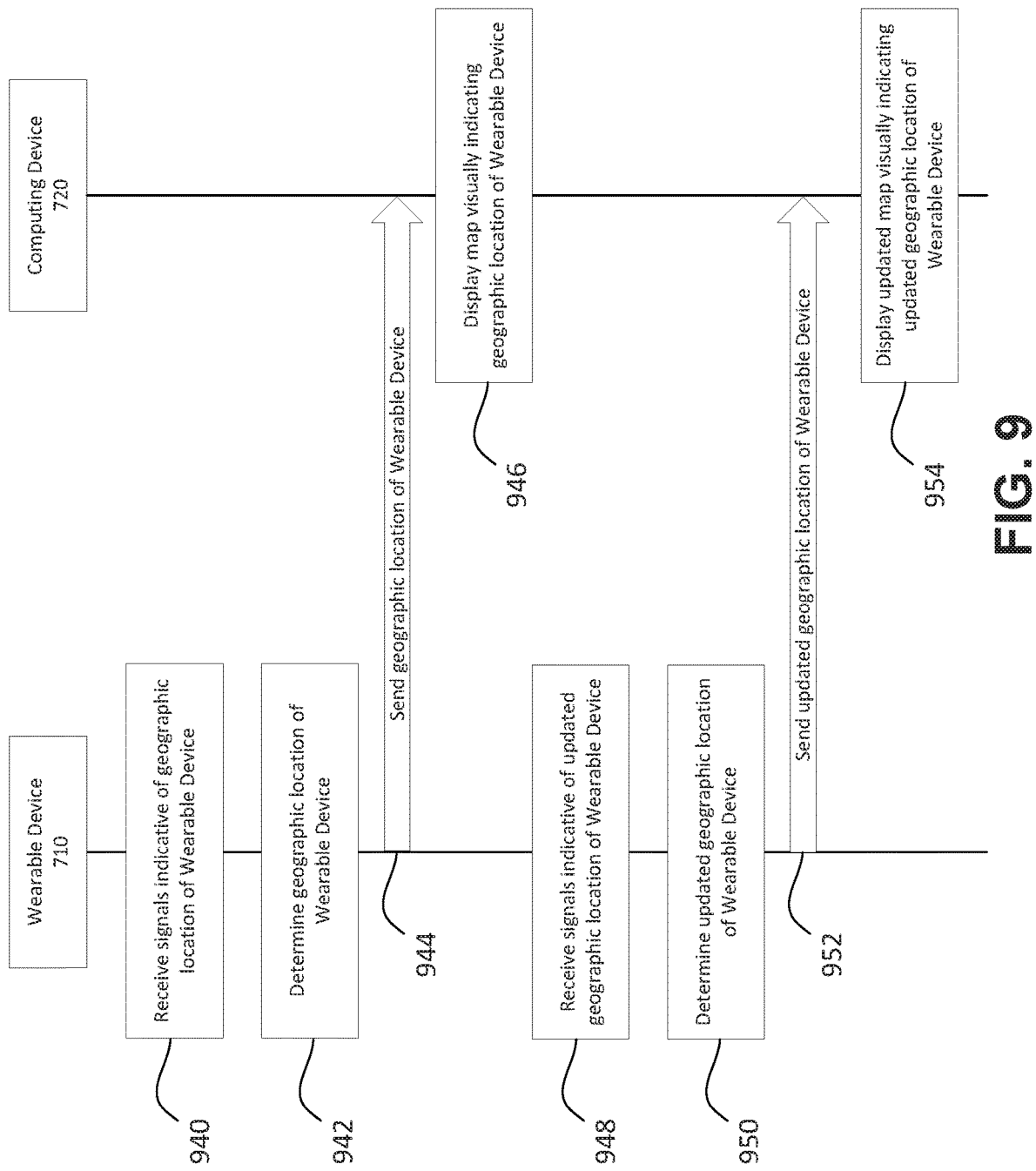
FIG. 9 depicts an illustrative flowchart of a system for tracking a wearable device, according to one or more embodiments described in this disclosure.

FIG. 9 depicts an illustrative system flow diagram for providing a map (e.g., a street map) with one or more visual indications to assist in tracking a wearable device, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a parent or caretaker may use an application executing on a computing device (e.g., a smartphone) of the parent or caretaker for tracking a child wearing a wearable device. The application may include a map display, which may display real-time or historical locations of a one or more devices, such as a wearable device worn by a child, multiple wearable devices worn by multiple children, and/or a device or devices of a parent or caretaker of the child or children. This allows the parent to track the child's location over time so that the parent can see not only where the child is, but also where the child has been. A map may display one or more defined geographic boundaries (e.g., geo-fence), the crossing of which by a child wearing a wearable device would trigger an alert.

In step 940, wearable device 710 may receive signals indicative of a geographic location of wearable device 710. For example, wearable device 710 may receive GPS signals, WiFi signals, cellular network signals, IP signals, and/or other signals that may be used to determine a geographic location of a device.

In step 942, wearable device 710 may determine, based on the signals indicative of the geographic location of wearable device 710, the geographic location of wearable device 710. Wearable device 710 may determine the geographic location of wearable device 710 in a similar manner as described in connection with step 842.

In step 944, wearable device 710 may send, and computing device 720 may receive, the geographic location of wearable device 710.

Figure 22:
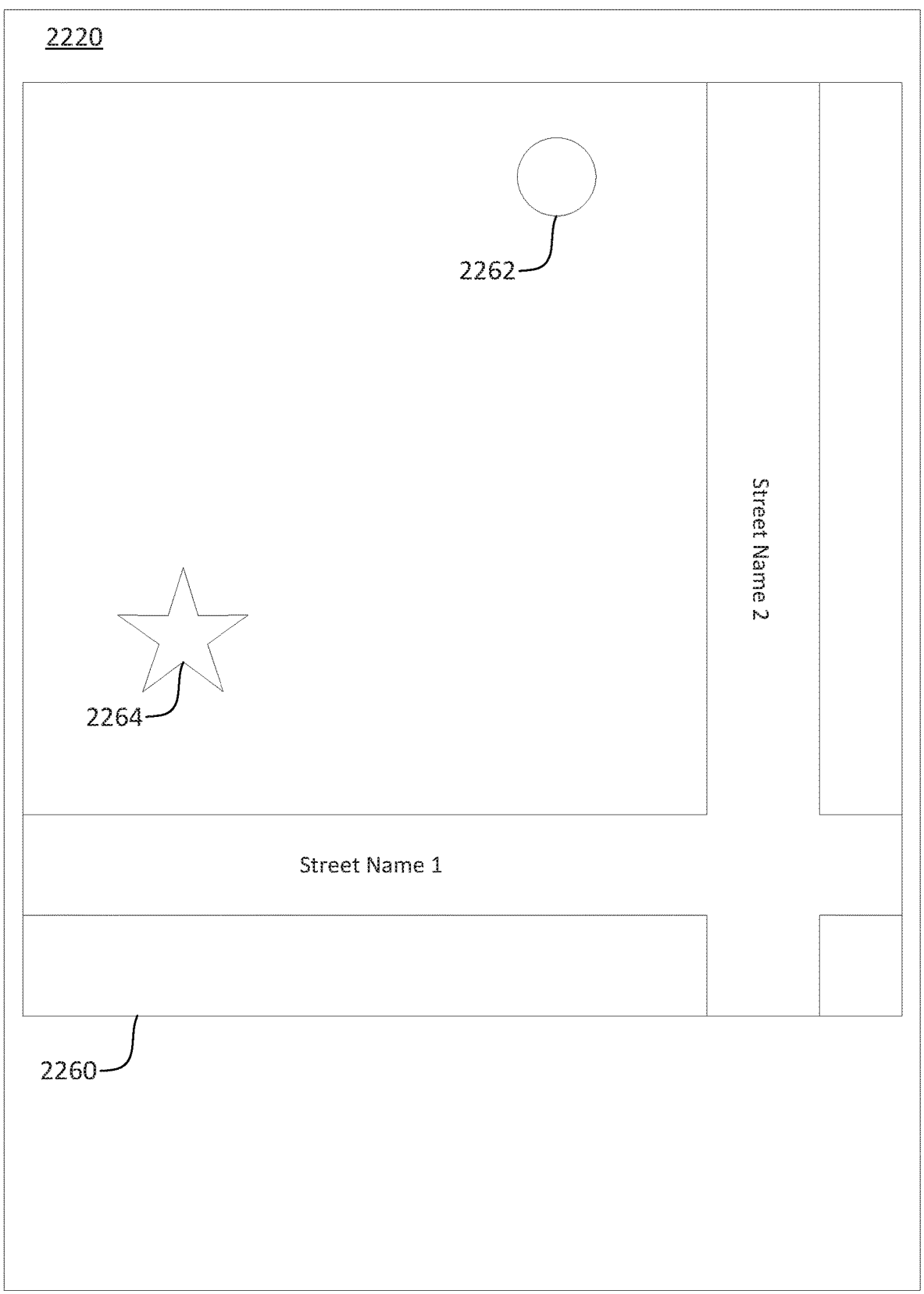
FIG. 22 depicts an illustrative user interface including a map for tracking a wearable device, according to one or more embodiments described in this disclosure.

In step 946, computing device 720 may display, via an application, a map visually indicating the geographic location of wearable device 710. For example, computing device 720 may display a map (e.g., map 2260) via a user interface (e.g., user interface 2220), as depicted in FIG. 22. The map may display one or more other locations, such as a location of computing device 720.

Returning to FIG. 9, in step 948, wearable device 710 may receive signals indicative of an updated geographic location of wearable device 710.

In step 950, wearable device 710 may determine, based on the signals indicative of the updated geographic location of wearable device 710, an updated geographic location of wearable device 710. Wearable device 710 may determine the updated geographic location of wearable device 710 in a similar manner as described in connection with step 842.

In step 952, wearable device 710 may send, and computing device 720 may receive, an updated geographic location of wearable device 710.

In step 954, computing device 720 may, after receiving, from wearable device 710, the updated geographic location of wearable device 710, display, via the application, an updated map visually indicating the updated geographic location of wearable device 710. For example, the map may periodically update to display the updated geographic location of wearable device 710. The map may thus display a real-time or historical location or locations of wearable device 710. The map may display a real-time or historical location of one or more additional devices, such as an updated geographic location of computing device 720, or one or more other devices, vehicles, boats, mechanical equipment, or the like. In this manner, a parent or caretaker viewing the map may view historical locations of a child and others in relation to the child, which may assist the parent in locating the child if the child is lost or missing.

Figure 10:
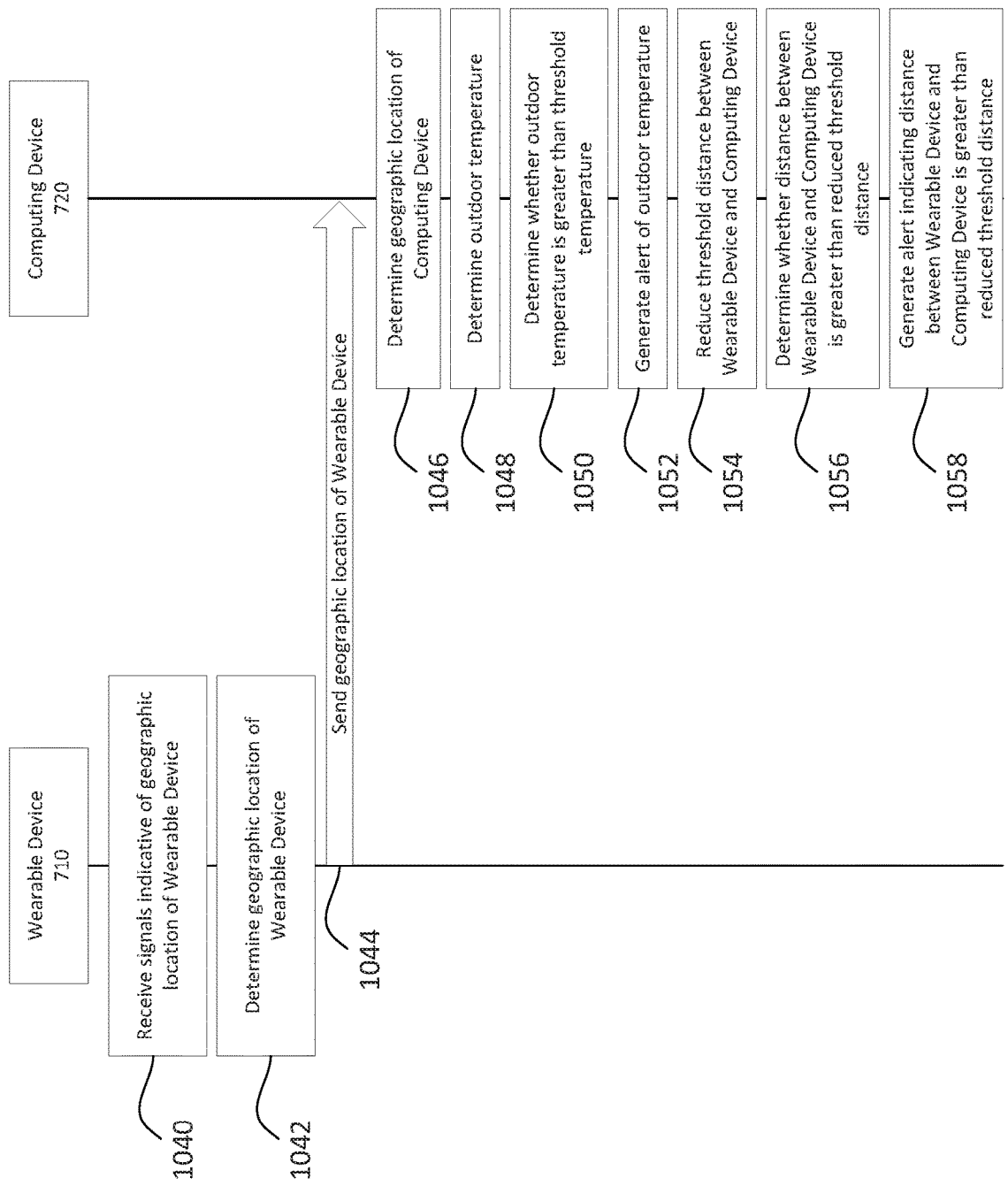
FIG. 10 depicts an illustrative flowchart of a system for tracking a wearable device, according to one or more embodiments described in this disclosure.

FIG. 10 depicts an illustrative system flow diagram for using outdoor weather information to adjust a method for tracking a wearable device, in accordance with one or more embodiments. For example, if an outdoor temperature is higher than typical (e.g., in summer), and a corresponding increased danger to a child or other user of a wearable device may exist (e.g., an increased danger due to a heat to a child left in a vehicle), then a system may implement an adjusted method for tracking a wearable device worn by the child or other user. Other examples of weather-related adjustments may include, for example, adjusting based on cold weather, thunderstorms, tornadoes, hurricanes, tropical storms, or the like. A method may be adjusted due to other natural phenomena such as, for example, earthquakes, landslides, tidal waves, or the like.

One or more steps of FIG. 10 may be similar to one or more steps described in connection with one or more other figures herein, and the implementation details of such a step may be similar to the implementation details described in connection with one or more other figures. One or more steps may be omitted, and one or more additional steps other that those depicted may be included.

In step 1040, wearable device 710 may receive signals indicative of a geographic location of wearable device 710. For example, wearable device 710 may receive GPS signals, WiFi signals, cellular network signals, IP signals, and/or other signals that may be used to determine a geographic location of a device.

In step 1042, wearable device 710 may determine, based on the signals indicative of the geographic location of wearable device 710, the geographic location of wearable device 710. Wearable device 710 may determine the geographic location of wearable device 710 in a similar manner as described in connection with step 842.

In step 1044, wearable device 710 may send, and computing device 720 may receive, the geographic location of wearable device 710.

In step 1046, computing device 720 may determine a geographic location of computing device 720. For example, computing device 720 may receive GPS signals, WiFi signals, cellular network signals, IP signals, and/or other signals that may be used to determine a geographic location of computing device 720.

In step 1048, computing device 720 may determine an outdoor temperature of the geographic location of computing device 720.

In step 1050, computing device 720 may determine whether the outdoor temperature of the geographic location of computing device 720 is greater than a threshold temperature.

In step 1052, computing device 720 may generate an alert indicating that the outdoor temperature of the geographic location of computing device 720 is greater than the threshold temperature.

In step 1054, computing device 720 may, based on determining that the outdoor temperature of the geographic location of computing device 720 is greater than the threshold temperature, reduce a threshold distance between computing device 720 and wearable device 710.

In step 1056, computing device 720 may determine whether a distance between wearable device 710 and computing device 720 is greater than the reduced threshold distance. For example, computing device 720 may determine, based on a short-range wireless connection (e.g., iBeacon, BLE) with wearable device 710, a distance between computing device 720 and wearable device 710. As another example, computing device 720 may determine the distance between computing device 720 and wearable device 710 based on a WiFi connection between computing device 720 and wearable device 710, based on GPS positioning of computing device 720 and GPS positioning of wearable device 710, based on UWB signals between computing device 720 and wearable device 710, or the like. Computing device 720 may determine the distance between computing device 720 and wearable device 710 using a combination of techniques.

In step 1058, computing device 720 may, in response to determining that the distance between wearable device 710 and computing device 720 is greater than the reduced threshold distance, generate an alert indicating that the distance between wearable device 710 and computing device 720 is greater than the reduced threshold distance. The alert may be similar to the alert described in connection with step 746.

Figure 11:
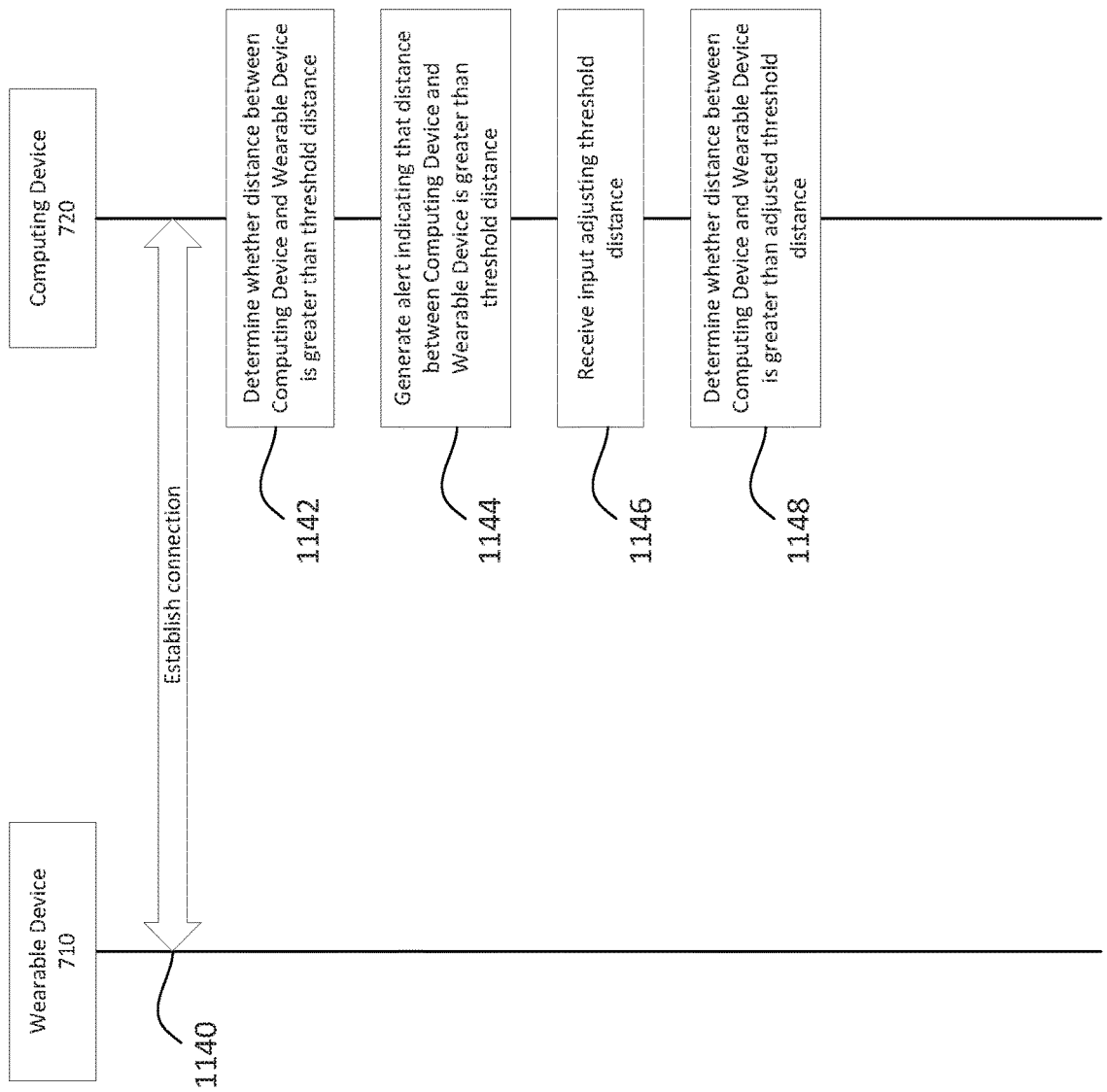
FIG. 11 depicts an illustrative flowchart of a system for tracking a wearable device, according to one or more embodiments described in this disclosure.

FIG. 11 depicts an illustrative system flow diagram for alerting a user of a computing device if the user is too far from a user of a wearable device, in accordance with one or more embodiments. For example, if a caretaker of a child exits a vehicle and leaves the child in the vehicle, the caretaker may be alerted and reminded to return and retrieve the child from the vehicle. Similarly, if the caretaker of the child leaves a home and the child is still in the home, or if the child leaves the home and the caretaker is still in the home, the caretaker may be alerted and prompted to go find the child.

One or more steps of FIG. 11 may be similar to one or more steps described in connection with one or more other figures herein, and the implementation details of such a step may be similar to the implementation details described in connection with one or more other figures. One or more steps may be omitted, and one or more additional steps other that those depicted may be included.

In step 1140, a connection may be established between wearable device 710 and computing device 720. For example, wearable device 710 may establish a connection with computing device 720, or computing device 720 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 1142, computing device 720 may determine whether a distance between wearable device 710 and computing device 720 is greater than a threshold distance. For example, computing device 720 may determine, based on a short-range wireless connection (e.g., iBeacon, BLE) with wearable device 710, a distance between computing device 720 and wearable device 710. As another example, computing device 720 may determine the distance between computing device 720 and wearable device 710 based on a WiFi connection between computing device 720 and wearable device 710, based on GPS positioning of computing device 720 and GPS positioning of wearable device 710, based on UWB signals between computing device 720 and wearable device 710, or the like. Computing device 720 may determine the distance between computing device 720 and wearable device 710 using a combination of techniques.

In step 1144, computing device 720 may, in response to determining that the distance between wearable device 710 and computing device 720 is greater than the threshold distance, generate an alert indicating that the distance between wearable device 710 and computing device 720 is greater than the threshold distance. The alert may be similar to the alert described in connection with step 746.

In step 1146, computing device 720 may receive input adjusting the threshold distance. For example, a user may provide, via an application executing on a computing device (e.g., computing device 720, a tablet, a laptop, a desktop, a mobile phone), input adjusting the threshold distance at which to receive an alert. As an example, a parent or caretaker of a child may set a first threshold distance when the child is a younger age, and adjust the threshold distance to a second threshold distance when the child is an older age.

In step 1148, computing device 720 may determine whether the distance between wearable device 710 and computing device 720 is greater than the adjusted threshold distance. For example, computing device 720 may determine the distance between wearable device 710 and computing device 720 based on the short-range wireless connection between wearable device 710 and computing device 720, similar to the description in connection with step 1142.

Figure 12:
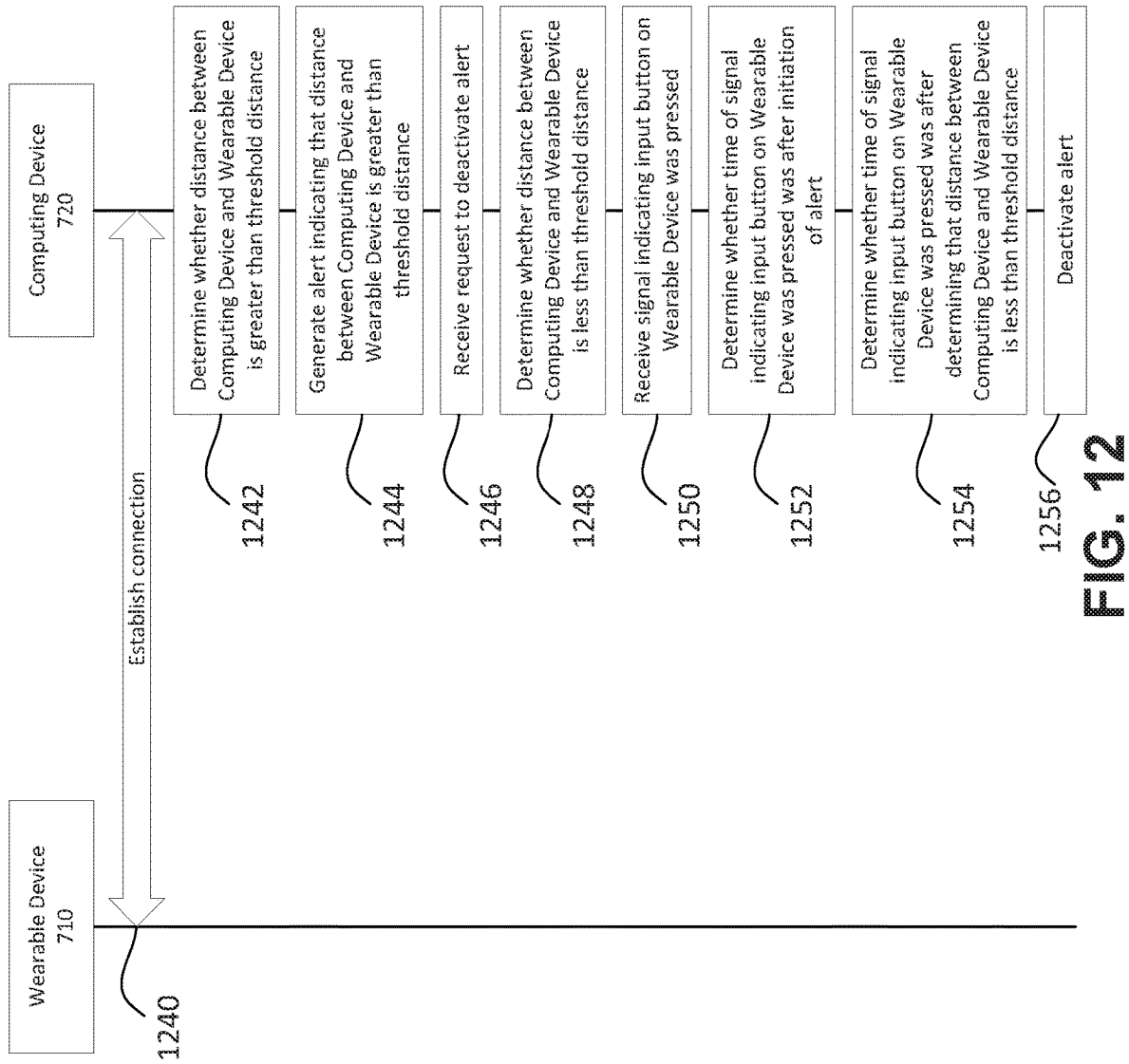
FIG. 12 depicts an illustrative flowchart of a system for tracking a wearable device, according to one or more embodiments described in this disclosure.

FIG. 12 depicts an illustrative system flow diagram for deactivating a tracking alert using an input button of a wearable device, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a parent or caretaker may become too far away from a child. For example, if a parent or caretaker leaves the child in a vehicle or becomes separated from the child in a public place (e.g., a shopping center, a beach, an amusement park), the parent or caretaker may receive an alert indicating that the child is too far away. The parent or caretaker may thereby be reminded to return to the child. In some instances, the alert might require that the parent or caretaker return to the child (e.g., bring a computing device of the parent or caretaker in proximity to a wearable device worn by the child) in order to deactivate the alert. This would prevent, for example, a parent or caretaker from leaving a child unattended in a vehicle and ignoring an alert that is generated in response. This would also prevent, for example, an abductor of a child from using the button on the wearable device to remotely deactivate an alert that is active on the computing device of the parent or caretaker.

In step 1240, a connection may be established between wearable device 710 and computing device 720. For example, wearable device 710 may establish a connection with computing device 720, or computing device 720 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 1242, computing device 720 may determine whether a distance between computing device 720 and wearable device 710 is greater than a threshold distance. For example, computing device 720 may determine whether the distance is greater than the threshold distance based on the connection between computing device 720 and wearable device 710, as described in connection with step 1142. This may occur, for example, if the parent or caretaker has become separated from the child.

In step 1244, computing device 720 may, in response to determining that the distance between wearable device 710 and computing device 720 is greater than the threshold distance, generate an alert indicating that the distance between wearable device 710 and computing device 720 is greater than the threshold distance. The alert may be similar to the alert described in connection with step 746.

In step 1246, computing device 720 may receive an input requesting to deactivate the alert. For example, a parent or caretaker might provide input to the computing device of the parent or caretaker in an attempt to deactivate the alert.

In step 1248, computing device 720 may, in response to receiving the input requesting to deactivate the alert, determine whether the distance between wearable device 710 and computing device 720 is less than the threshold distance. Thus, the computing device may determine whether the parent or caretaker has returned to the child. This may ensure that the parent or caretaker returns to the child before the alert is deactivated.

In step 1250, computing device 720 may receive a signal indicating that the input button on wearable device 710 was pressed. For example, after the parent or caretaker returns to the child, the parent or caretaker may press the input button on the wearable device.

In step 1252, computing device 720 may determine, based on the signal indicating that the input button on wearable device 710 was pressed, whether a time of the signal indicating that the input button was pressed was after initiation of the alert. For example, the computing device may determine whether a received button press was after a parent or caretaker became separated from a child, thereby triggering an alert.

In step 1254, computing device 720 may determine, based on the signal indicating that the input button on wearable device 710 was pressed, whether the time of the signal indicating that the input button was pressed was after determining that the distance between wearable device 710 and computing device 720 is less than the threshold distance. For example, the computing device may determine whether the received button press was after the parent or caretaker returned to the child while the alert was active (since the computing device may have prevented the parent or caretaker from deactivating the alert without first returning to the child).

In step 1256, computing device 720 may, based on determining that the time of the signal was after the initiation of the alert and after the determining that the distance between wearable device 710 and computing device 720 is less than the threshold distance, deactivate the alert. Thus, the computing device may determine whether the received button press was after the parent or caretaker was separated from the child—thereby triggering an alert—and also after the parent or caretaker returned to the child. This may ensure that earlier, outdated button presses do not deactivate an alert, but instead that a button press after a parent has returned to a child deactivates the alert.

Figure 13:
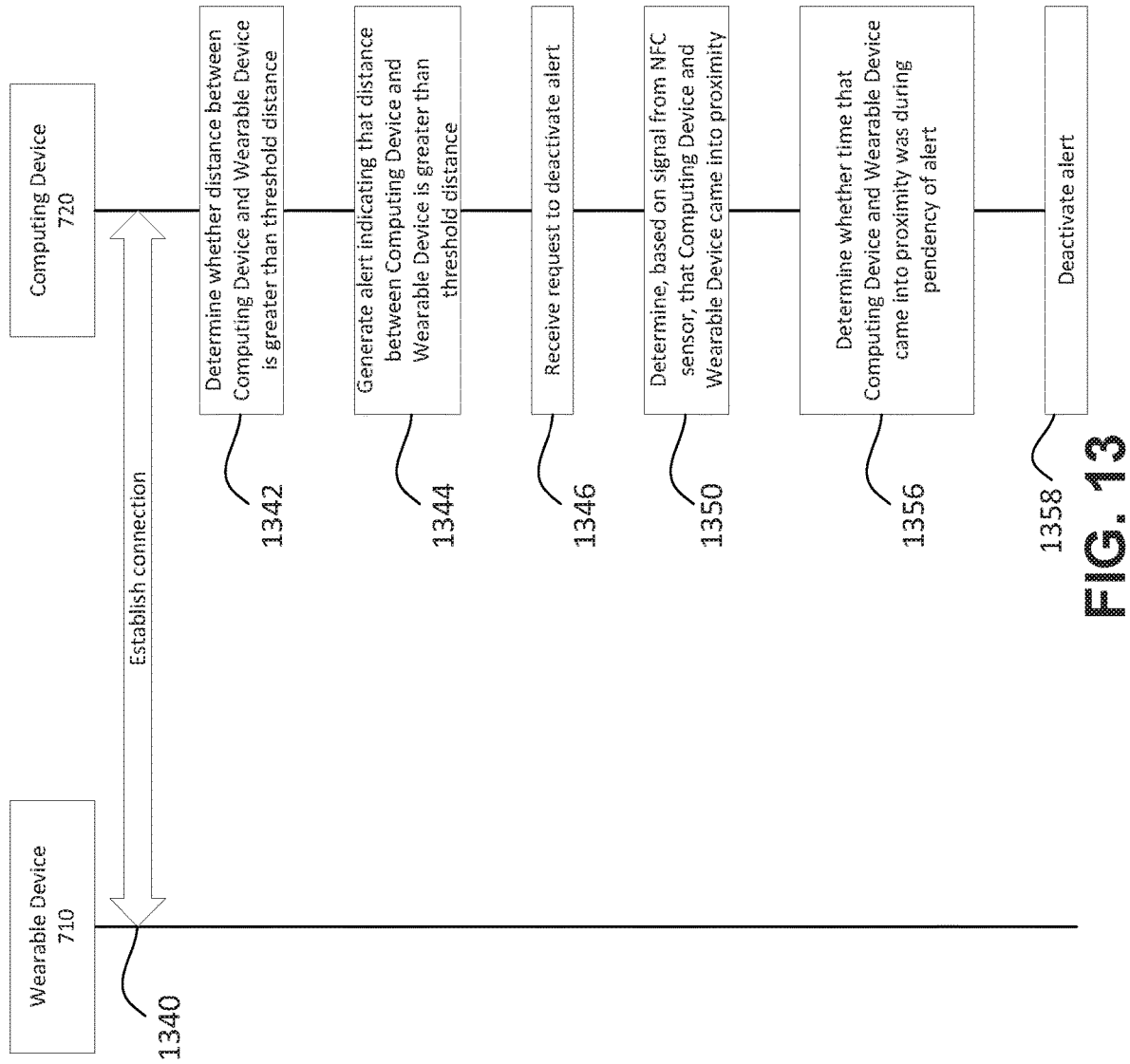
FIG. 13 depicts an illustrative flowchart of a system for tracking a wearable device, according to one or more embodiments described in this disclosure.

FIG. 13 depicts an illustrative system flow diagram for deactivating a tracking alert based on an NFC connection, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In some instances, similar to a scenario of FIG. 12, a parent or caretaker may be notified if the parent or caretaker is too far away from a child. An NFC signal or other communication between the wearable device and a device of the parent or caretaker may confirm that the parent or caretaker is close to the child before an alert on the device of the parent or caretaker can be deactivated. This may prevent a parent or caretaker from using the parent's device to deactivate the alert without first returning to the child (e.g., thereby preventing the parent or caretaker from leaving the child, e.g., in a vehicle), and/or may prevent a child or abductor from using an input button on the wearable device to deactivate the alert if the parent or caretaker has not returned to the child.

In step 1340, a connection may be established between wearable device 710 and computing device 720. For example, wearable device 710 may establish a connection with computing device 720, or computing device 720 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 1342, computing device 720 may determine whether a distance between computing device 720 and wearable device 710 is greater than a threshold distance. For example, computing device 720 may determine whether the distance is greater than the threshold distance based on the connection between computing device 720 and wearable device 710, as described in connection with step 1142.

In step 1344, computing device 720 may, in response to determining that the distance between wearable device 710 and computing device 720 is greater than the threshold distance, generate an alert indicating that the distance between wearable device 710 and computing device 720 is greater than the threshold distance. The alert may be similar to the alert described in connection with step 746.

In step 1346, computing device 720 may receive an input requesting to deactivate the alert.

In step 1350, computing device 720 may determine, based on a signal from an NFC sensor of computing device 720, that computing device 720 and wearable device 710 came into close proximity. For example, computing device 720 may determine whether an NFC sensor of computing device 720 detected an NFC tag of wearable device 710.

In step 1356, computing device 720 may determine whether computing device 720 and wearable device 710 came into close proximity during pendency of the alert. For example, computing device 710 may compare a timestamp of an NFC connection event identified by NFC sensor of computing device 720 to a time period of the alert. If the timestamp indicates that the NFC connection event occurred during pendency of the alert (e.g., after the parent or caretaker was too far away from the child and an alert was triggered, and the parent or caretaker then returned to the child and tapped the computing device of the parent or caretaker against the wearable device or otherwise triggered an NFC connection event), then computing device 710 may determine that computing device 720 and wearable device 710 came into close proximity during pendency of the alert.

In step 1358, computing device 720 may, after receiving the indication that the computing device and the wearable device came into close proximity during pendency of the alert, stop the alert. In this manner, deactivation of the alert can be based on the parent or caretaker first returning to the child.

Figure 14:
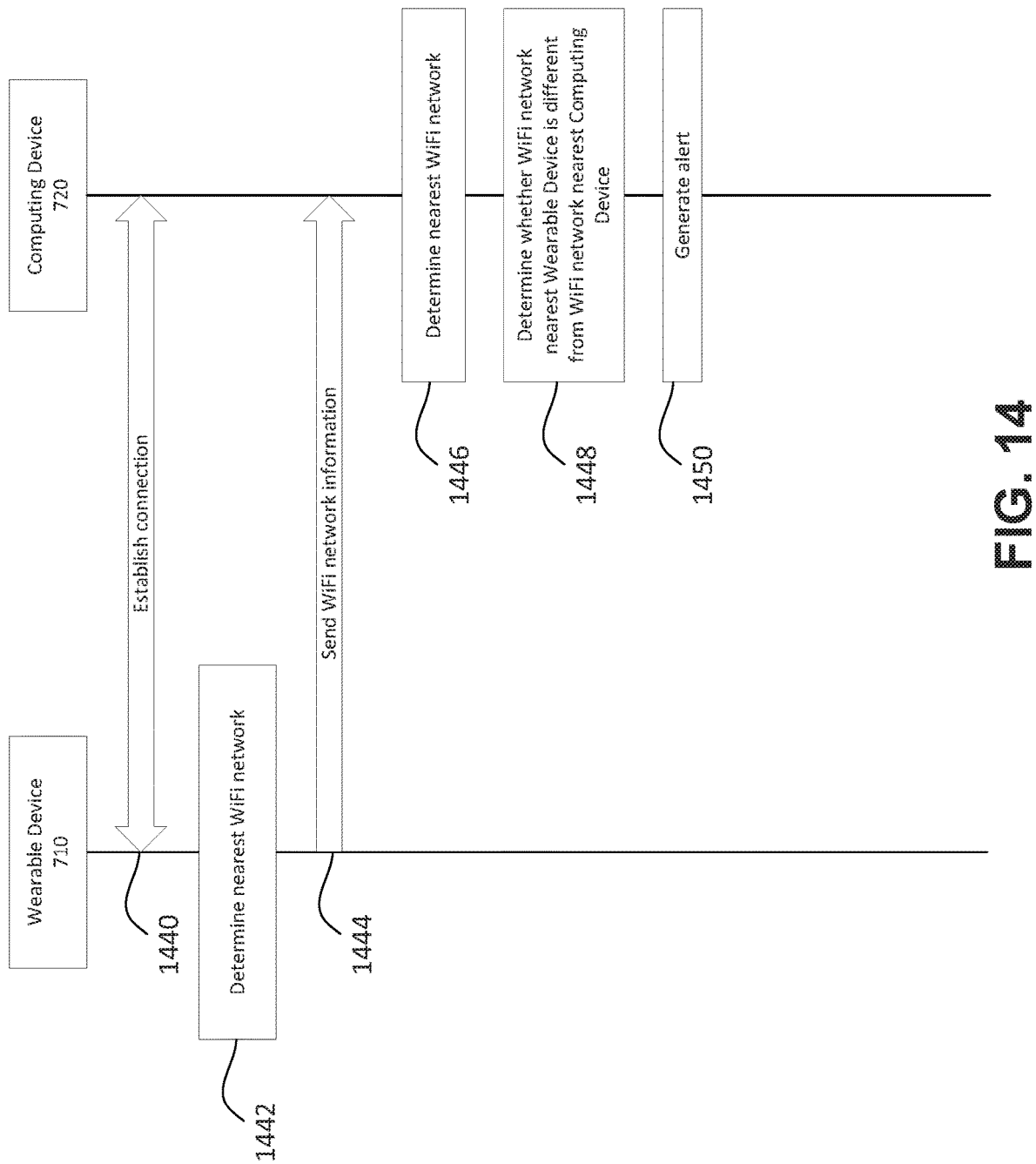
FIG. 14 depicts an illustrative flowchart of a system for tracking a wearable device, according to one or more embodiments described in this disclosure.

FIG. 14 depicts an illustrative system flow diagram for comparing wireless networks when tracking a wearable device, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a separation of the parent or caretaker from the child may be determined based on one or more alternative approaches to those described elsewhere herein. For example, differences in wireless networks detected by a wearable device and a computing device of a parent or caretaker may be used to determine whether the wearable device and the computing device of the parent or caretaker are in the same or similar geographic location. These one or more alternative approaches may be used instead of or in addition to other approaches, (e.g., to verify determinations made using other methods).

In step 1440, a connection may be established between wearable device 710 and computing device 720. For example, wearable device 710 may establish a connection with computing device 720, or computing device 720 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 1442, wearable device 710 may determine information indicating a wireless network (e.g., WiFi network, cellular network, BLUETOOTH network, UWB network) nearest to wearable device 710. For example, wearable device 710 may identify one or more wireless network signals receivable by wearable device 710, and determine a corresponding signal strength for each. Wearable device 710 may determine, based on the signal strength of each wireless network, which wireless network is closest to wearable device 710.

In step 1444, wearable device 710 may send, to computing device 720, information indicating a wireless network nearest to wearable device 710. Wearable device 710 may send information regarding more than one wireless network.

In step 1446, computing device 720 may determine information indicating a wireless network (e.g., WiFi network, cellular network, BLUETOOTH network, UWB network) nearest to computing device 720. For example, computing device 720 may identify one or more wireless network signals receivable by computing device 720, and determine a corresponding signal strength for each. Computing device 720 may determine, based on the signal strength of each wireless network, which wireless network is closest to computing device 720.

In step 1448, computing device 720 may determine whether the wireless network nearest to wearable device 710 is different from the wireless network nearest to computing device 720.

In step 1450, computing device 720 may, based on determining that the wireless network nearest to wearable device 710 is different from the wireless network nearest to computing device 720, generate an alert indicating that the distance between computing device 720 and wearable device 710 may be greater than the threshold distance. The alert may be similar to the alert described in connection with step 746.

Alternatively or additionally, computing device 720 may generate an alert based on additional information related to one or more wireless networks in proximity to wearable device 710 and/or computing device 720 (e.g., computing device 720 may determine whether one or more wireless networks detectable by wearable device 710 is different from one or more wireless networks detectable by computing device 720, and generate an alert if there is a difference or if there are too many different networks). The alert may be similar to the alert described in connection with step 746.

Figure 15:
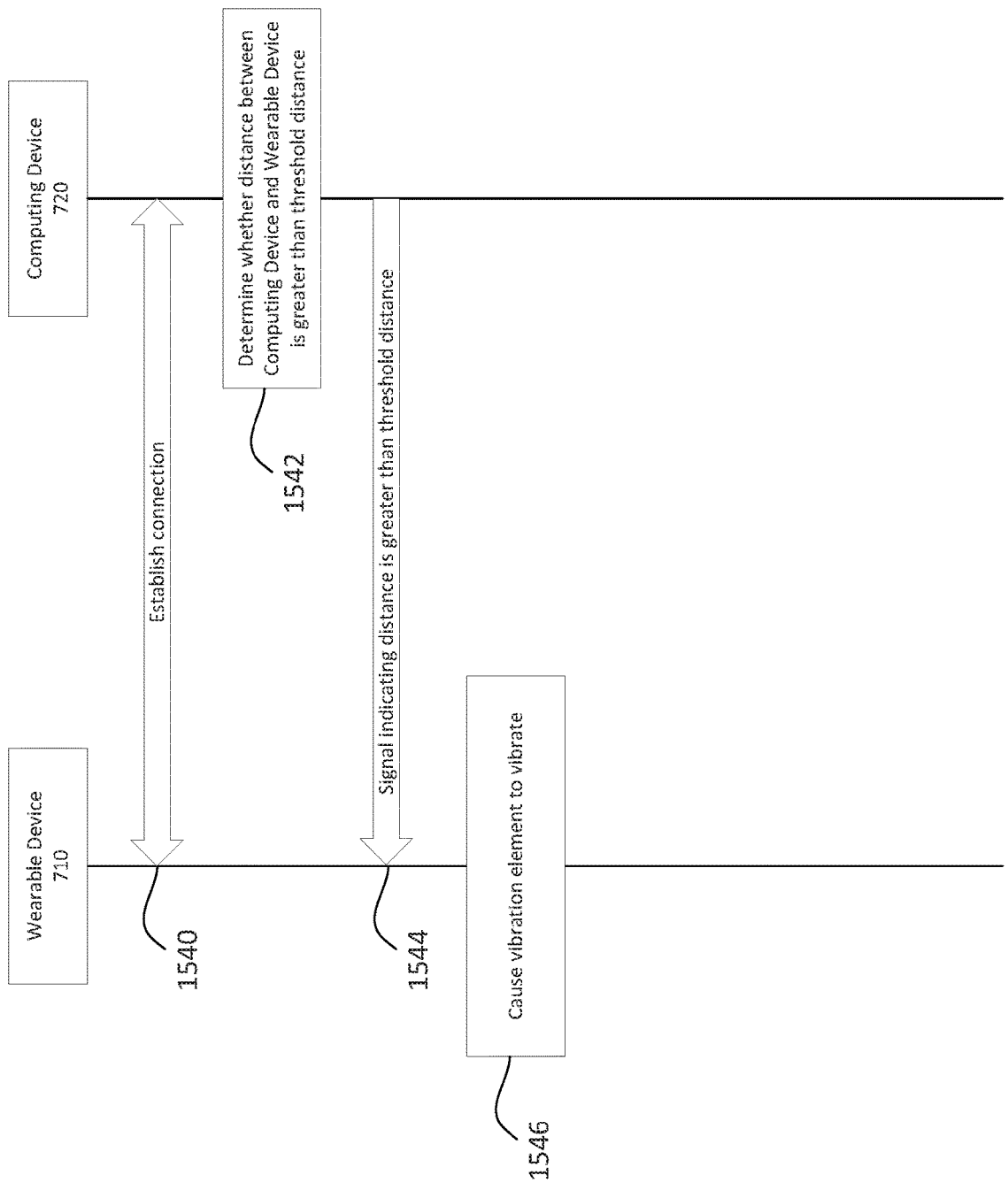
FIG. 15 depicts an illustrative flowchart of a system for tracking a wearable device, according to one or more embodiments described in this disclosure.

FIG. 15 depicts an illustrative system flow diagram for providing tactile feedback on a wearable device, such as wearable device 710, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a wearable device may provide an alert or other feedback to the child, indicating that the child is too far from the parent or caretaker. For example, if the parent or caretaker is in a public place with the child, and the child wanders off, the child may receive a notification that the child has strayed too far from the parent or caretaker. This notification may thereby inspire the child to find the parent or caretaker.

Similar to the description of wearable device 210 in connection with FIG. 2, wearable device 710 may include a vibration device, which may vibrate responsive to computer-readable instructions stored on wearable device 710.

In step 1540, a connection may be established between wearable device 710 and computing device 720. For example, wearable device 710 may establish a connection with computing device 720, or computing device 720 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 1542, computing device 720 may determine whether a distance between wearable device 710 and computing device 720 is greater than a threshold distance. For example, computing device 720 may determine whether the distance is greater than the threshold distance based on the connection between computing device 720 and wearable device 710, as described in connection with step 1142.

In step 1544, wearable device 710 may receive a signal indicating that the distance between wearable device 710 and computing device 720 is greater than the threshold distance.

In step 1546, in response to receiving the signal indicating that the distance between wearable device 710 and computing device 720 is greater than the threshold distance, wearable device 710 may cause a vibration element of wearable device 710 to vibrate.

FIG. 16 depicts an illustrative system flow diagram for updating software, firmware, and/or other instructions on a wearable device 710, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, it may be desirable to update software, firmware, or settings that control operation of a wearable device. For example, a software update may fix programming bugs, add new features, remove outdated features, or the like. As another example, a parent or caretaker might update one or more settings on an online account that the wearable device is associated with, and the updated settings might be transmitted to the wearable device.

In step 1640, wearable device 710 may receive updated instructions that control operation of wearable device 710. For example, wearable device 710 may receive updated software, updated firmware, updated settings, or the like. Wearable device 710 may receive the updated instructions via a wired connection (e.g., USB) and/or a wireless connection (e.g., WiFi, short-range wireless connection).

In step 1642, wearable device 710 may store the updated instructions that control operation of wearable device 710. For example, wearable device 710 may store updated software, updated firmware, updated settings, or the like. Wearable device 710 may restart, initiate a backup, or take one or more actions triggered by the updated instructions.

Figure 17:
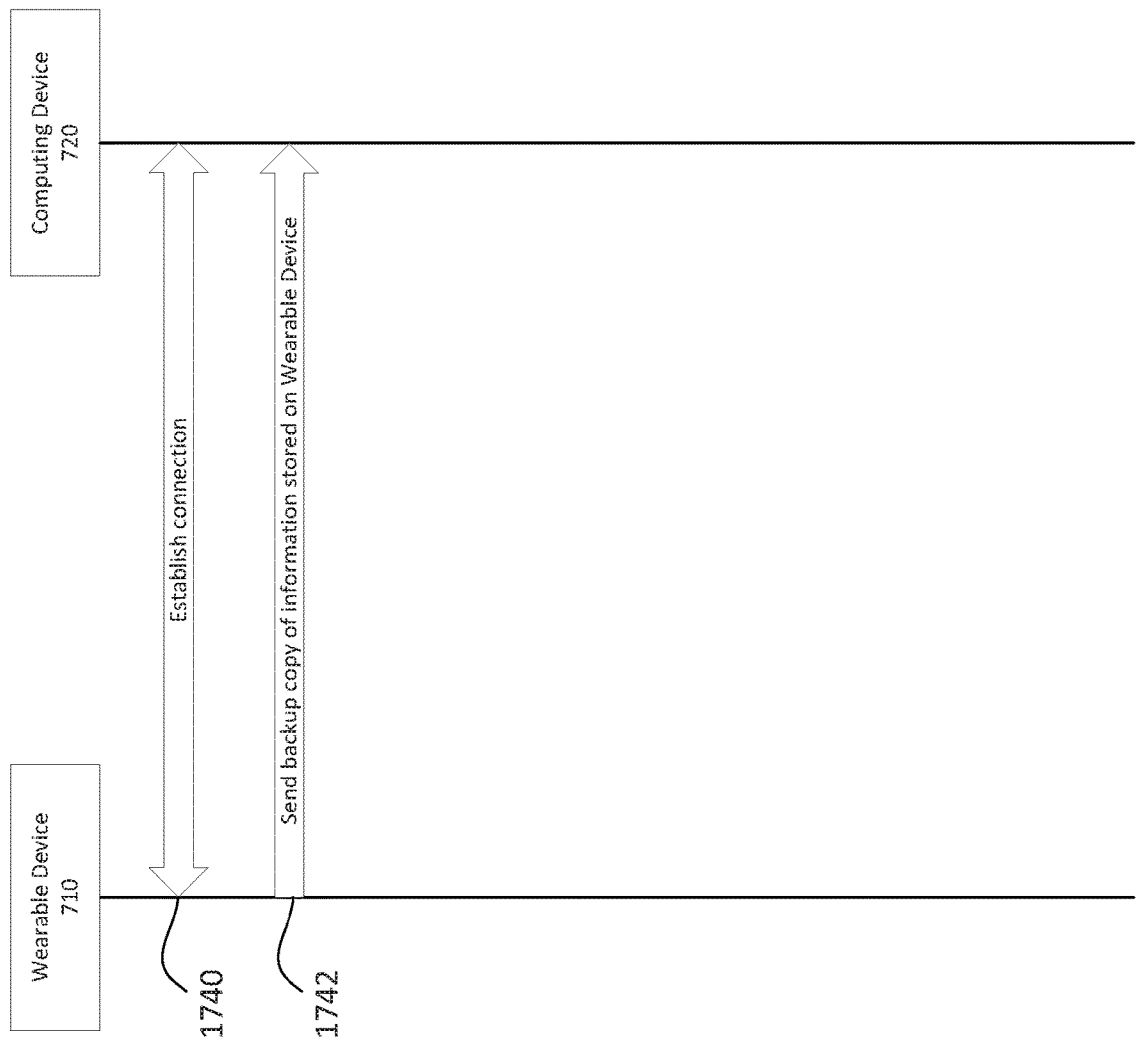
FIG. 17 depicts an illustrative flowchart of a system for tracking a wearable device, according to one or more embodiments described in this disclosure.

FIG. 17 depicts an illustrative system flow diagram for backing up information on a wearable device, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a parent or caretaker may wish to backup information or settings of a wearable device. For example, if a wearable device stores historical location information of a child, the parent or caretaker may wish to backup that information in case the wearable device is lost or stolen or in case the child is lost or abducted (e.g., thereby providing a record that law enforcement may use to assist in locating the child). As another example, the parent or caretaker may wish to offload information from the wearable device in order to free up memory storage space on the wearable device.

In step 1740, a connection may be established between wearable device 710 and computing device 720. For example, wearable device 710 may establish a connection with computing device 720, or computing device 720 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 1742 wearable device 710 may send, to computing device 720, a backup copy of information stored on wearable device 710.

Figure 18:
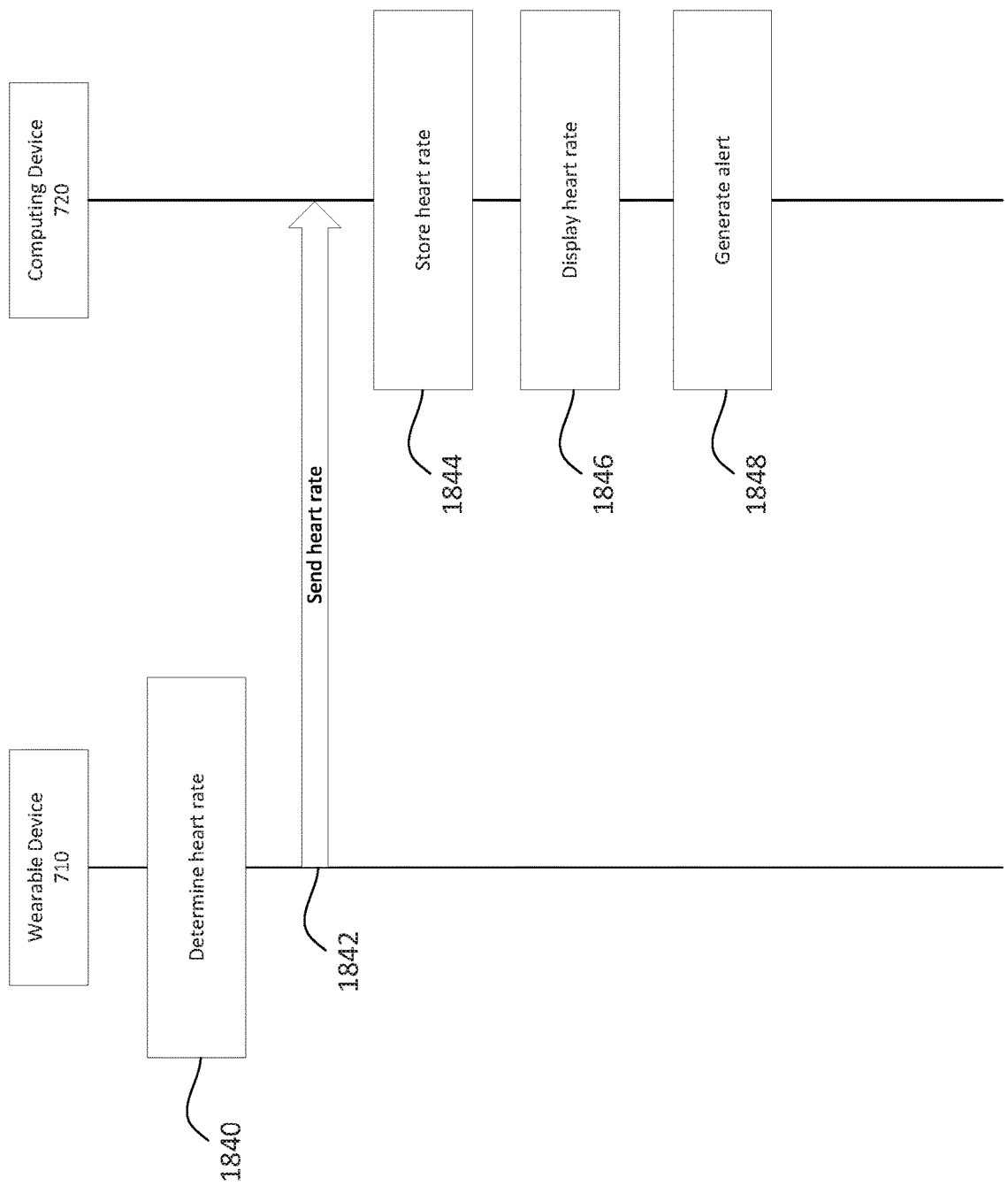
FIG. 18 depicts an illustrative flowchart of a system for tracking a wearable device, according to one or more embodiments described in this disclosure.

FIG. 18 depicts an illustrative system flow diagram for using a wearable device to determine a heart rate of a user of the wearable device, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a parent or caretaker may wish to monitor health information of a child wearing wearable device. The child's heart rate may change if the child is left behind, lost, or abducted, in response to the child becoming stressed or scared. The child's heart rate may change if the child is experiencing a medical emergency (e.g., a heart attack). Thus, the parent or caretaker may receive, based on the heart rate or other health information of the child collected by the wearable device, notification of a problem the child may be experiencing.

In step 1840, wearable device 710 may determine, via the heart-rate sensor, a heart rate of a user of wearable device 710. For example, wearable device 710 may determine a heart rate of a child wearing wearable device 710.

In step 1842, wearable device 710 may transmit, to computing device 720, the heart rate of the user of wearable device 710. Computing device 720 may receive the heart rate of the user of wearable device 710.

In step 1844, computing device 720 may store the heart rate of the user of wearable device 710. For example, computing device 720 may store the heart rate locally on computing device 720, and/or on a cloud service (e.g., on an online account that wearable device 710 and/or computing device 720 is associated with).

In step 1846, computing device 720 may display the heart rate of the user of wearable device 710. For example, computing device 720 may execute an application that displays health information, such as a heart rate, of a child wearing wearable device 710. The application may include visual representations (e.g., charts, graphs) of health information, textual representations, or other representations of the health information. The application may display analytics of the health information, thereby allowing a parent or caretaker to derive insights from the health information.

In step 1848, computing device 720 may generate an alert responsive to the heart rate of the user of wearable device 710. The alert may be similar to the alert described in connection with step 746. The alert may include information about a heart rate of the child. For example, if a child is lost, left behind, abducted, hurt, nervous, scared, experiencing a medical emergency, or the like, the child's heart rate may be different from a typical heart rate. Computing device 720 may compare the heart rate of the user of wearable device 710 to a stored historical heart rate of the user of wearable device 710. In response to determining that the heart rate of the user of wearable device 710 is different from the stored historical heart rate of the user of wearable device 710, computing device 720 may generate the alert.

Figure 19:
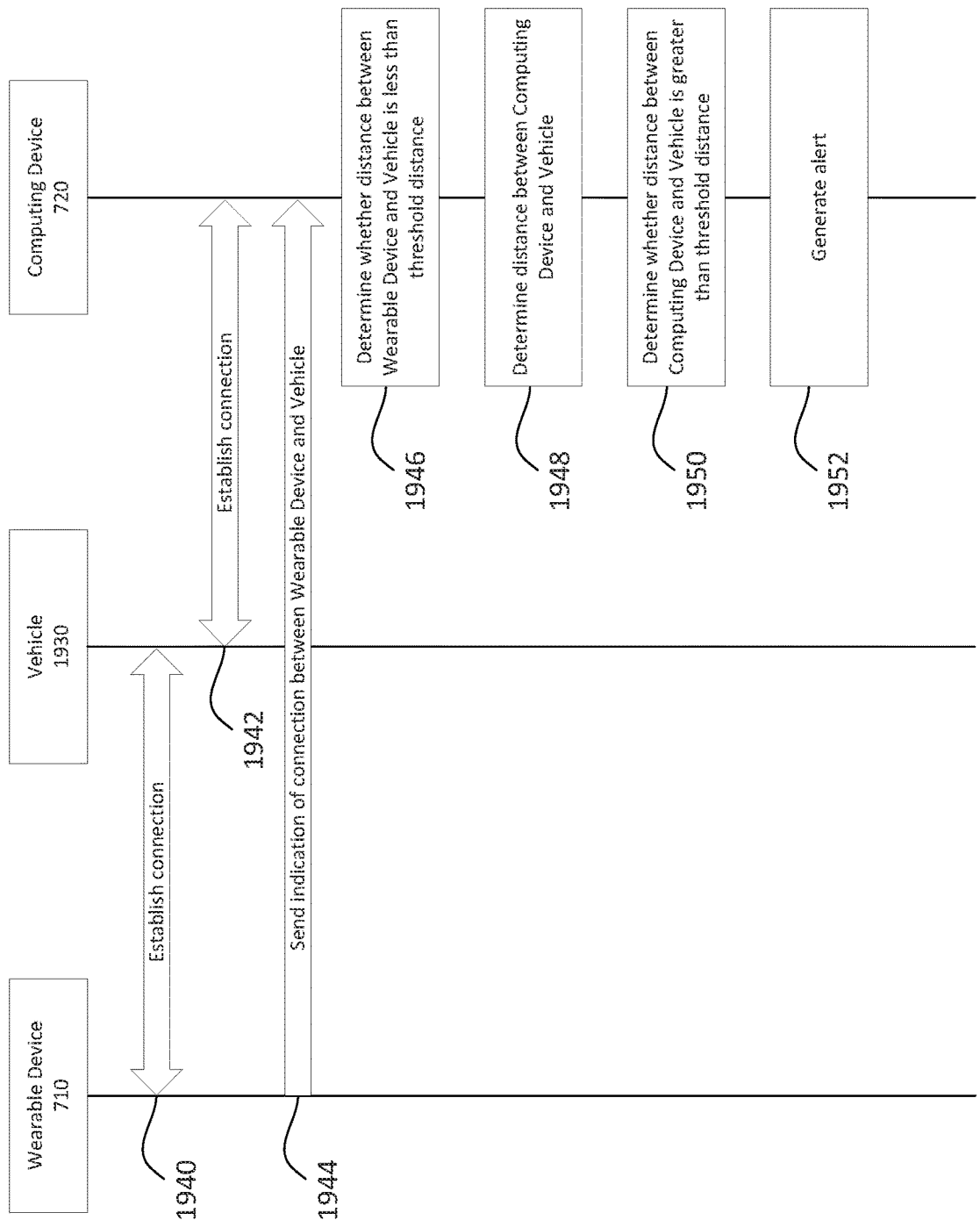
FIG. 19 depicts an illustrative flowchart of a system for tracking a wearable device, according to one or more embodiments described in this disclosure.

FIG. 19 depicts a system for preventing inadvertently leaving a child in a vehicle, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a vehicle computer may communicate with a wearable device worn by a child and/or a computing device (e.g., smartphone) of a parent or caretaker. The vehicle computer may communicate with the wearable device and/or the computing device to determine whether a parent or caretaker's device is far from a vehicle while the wearable device worn by the child is close to the vehicle. Based on this determination, a parent or caretaker may be alerted that the child was left in the vehicle.

In step 1940, a connection may be established between wearable device 710 and vehicle device 1930. For example, wearable device 710 may establish a connection with vehicle device 1930, or vehicle device 1930 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 1942, a connection may be established between computing device 720 and vehicle device 1930. For example, computing device 720 may establish a connection with vehicle device 1930, or vehicle device 1930 may establish a connection with computing device 720. The connection may be a wired or a wireless connection. For example, the connection may be a USB connection, a WiFi connection, a short-range wireless (e.g., BLUETOOTH) connection, an NFC connection, or another type of connection.

In step 1944, wearable device 710 may transmit, to computing device 720, an indication of the connection between wearable device 710 and vehicle device 1930. For example, wearable device 710 may send an indication of a signal strength of a short-range wireless connection, a WiFi connection, a UWB connection, or the like. Wearable device 710 may send location information (e.g., GPS information) of wearable device 710 to computing device 720. Computing device 720 may receive the indication of the connection between wearable device 710 and vehicle device 1930.

In step 1946, computing device 720 may determine whether a distance between wearable device 710 and vehicle device 1930 is less than a threshold distance. In one or more embodiments, computing device 720 may determine, based on the indication of the connection between wearable device 710 and vehicle device 1930, whether the distance between wearable device 710 and vehicle device 1930 is less than the threshold distance. For example, computing device 720 may determine, based on a short-range wireless connection (e.g., iBeacon, BLE) between wearable device 710 and vehicle device 1930, a distance between wearable device 710 and vehicle device 1930. As another example, computing device 720 may determine the distance between wearable device 710 and vehicle device 1930 based on a WiFi connection between wearable device 710 and vehicle device 1930, based on GPS positioning of wearable device 710 and GPS positioning of vehicle device 1930, based on UWB signals between wearable device 710 and vehicle device 1930, or the like. Computing device 720 may determine the distance between wearable device 710 and vehicle device 1930 using a combination of techniques.

In step 1948, computing device 720 may determine, based on the connection between computing device 720 and vehicle device 1930, a distance between computing device 720 and vehicle device 1930. For example, computing device 720 may determine, based on a short-range wireless connection (e.g., iBeacon, BLE) between computing device 720 and vehicle device 1930, a distance between computing device 720 and vehicle device 1930. As another example, computing device 720 may determine the distance between computing device 720 and vehicle device 1930 based on a WiFi connection between computing device 720 and vehicle device 1930, based on GPS positioning of computing device 720 and GPS positioning of vehicle device 1930, based on UWB signals between computing device 720 and vehicle device 1930, or the like. Computing device 720 may determine the distance between computing device 720 and vehicle device 1930 using a combination of techniques.

In step 1950, computing device 720 may determine, based on the distance between computing device 720 and vehicle device 1930, whether the distance between computing device 720 and vehicle device 1930 is greater than the threshold distance.

In step 1952, computing device 720 may, based on determining that the distance between wearable device 710 and vehicle device 1930 is less than the threshold distance and that the distance between computing device 720 and vehicle device 1930 is greater than the threshold distance, generate an alert indicating that the distance between wearable device 710 and vehicle device 1930 is less than the threshold distance and that the distance between computing device 720 and vehicle device 1930 is greater than the threshold distance. For example, the alert may be similar to the alert described in connection with step 746. Thus, a parent or caretaker may be notified that the parent or caretaker has left the vehicle and the child is still in the vehicle.

Figure 20:
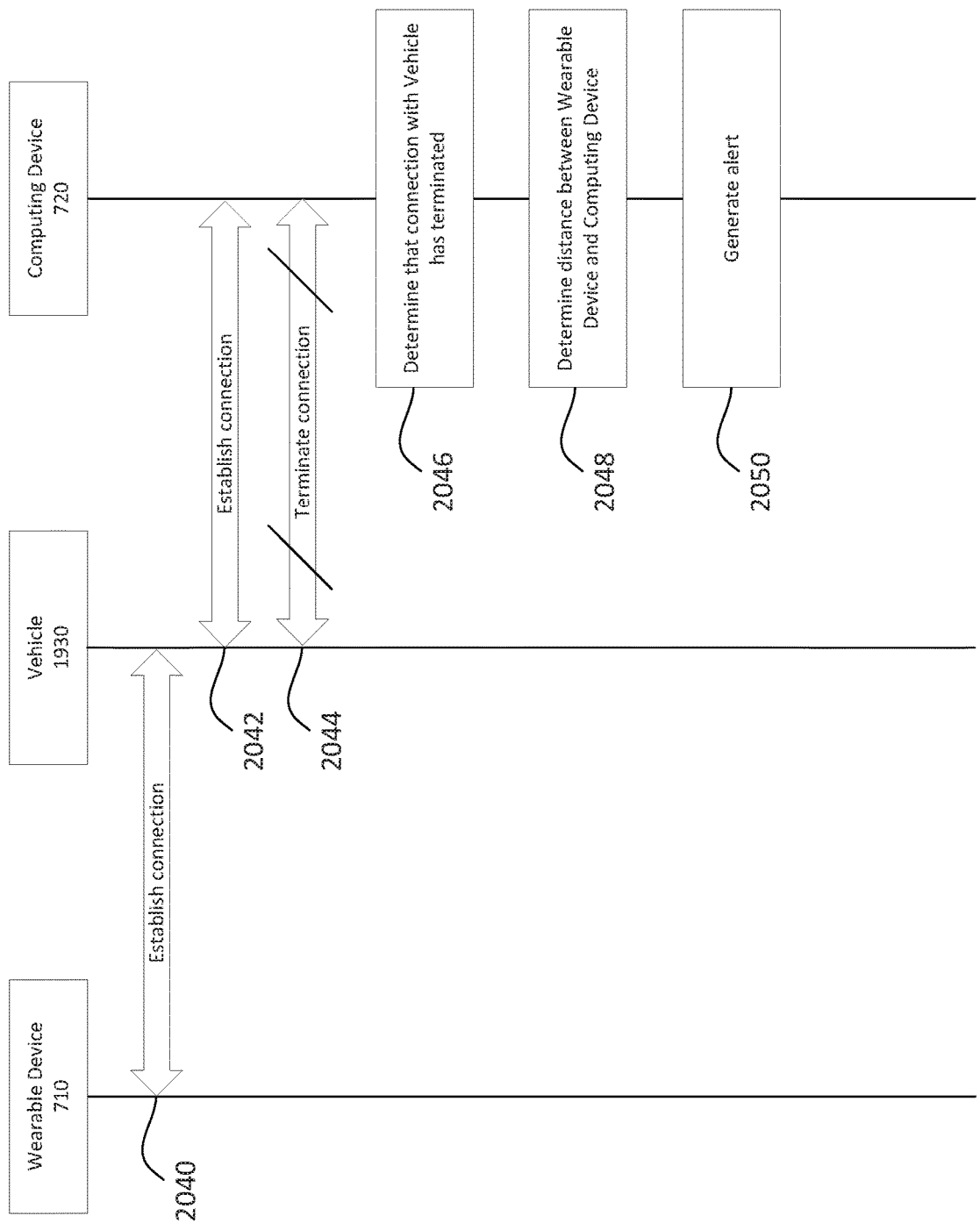
FIG. 20 depicts an illustrative flowchart of a system for tracking a wearable device, according to one or more embodiments described in this disclosure.

FIG. 20 depicts a system for preventing inadvertently leaving a child in a vehicle, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, similar to the description in connection with FIG. 19, a system may communicate with an on-board computer of a vehicle to assist in determining whether a child was left in a vehicle. Many vehicles allow for smartphones or other devices to be paired with a vehicle. If a parent or caretaker exits a vehicle, and a connection between the parent or caretaker's device is terminated, that may indicate that the parent or caretaker has exited the vehicle. The parent or caretaker leaving the vehicle may trigger the parent or caretaker's device to determine whether the parent or caretaker is too far from a wearable device of a child, and trigger an alert if so (e.g., to trigger an alert if the parent or caretaker left the child in the vehicle).

In step 2040, a connection may be established between wearable device 710 and vehicle device 1930. For example, wearable device 710 may establish a connection with vehicle device 1930, or vehicle device 1930 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 2042, a connection may be established between computing device 720 and vehicle device 1930. For example, computing device 720 may establish a connection with vehicle device 1930, or vehicle device 1930 may establish a connection with computing device 720. The connection may be a wired or a wireless connection. For example, the connection may be a USB connection, a WiFi connection, a short-range wireless (e.g., BLUETOOTH) connection, an NFC connection, or another type of connection.

In step 2044, the connection between computing device 720 and vehicle device 1930 may be terminated. For example, if the vehicle is turned off, the connection may be terminated. In another example, if computing device 720 is too far away from the vehicle (e.g., if a user carrying computing device 720 leaves the vehicle and is too far away from the vehicle for the connection to be maintained), the connection may be terminated.

In step 2046, computing device 720 may determine that the connection between computing device 720 and vehicle device 1930 has terminated. Alternatively or additionally, vehicle device 1930 may determine that the connection between computing device 720 and vehicle device 1930 has terminated. Vehicle device 1930 may send a signal to computing device 720 indicating that the connection between computing device 720 and vehicle device 1930 has terminated.

In step 2048, computing device 720 may determine a distance between wearable device 710 and computing device 720. Computing device 720 may determine the distance based on determining that the connection between computing device 720 and vehicle device 1930 has terminated. For example, if computing device 720 periodically determines a distance between computing device 720 and wearable device 710, computing device 720 may determine the distance between wearable device 710 and computing device 720 regardless of the time elapsed since the computing device 720 last determined the distance between wearable device 710 and computing device 720 (e.g., if computing device 720 would otherwise wait for an additional period of time before re-determining the distance between wearable device 710 and computing device 720, computing device 720 may immediately re-determine the distance between wearable device 710 and computing device 720 responsive to determining that the connection between computing device 720 and vehicle device 1930 has terminated). In this manner, if a parent or caretaker exits a vehicle and walks away with a computing device of the parent or caretaker, and a child wearing wearable device 710 remains in the vehicle, once the computing device of the parent or caretaker is far enough away from the vehicle to disconnect from the vehicle, the computing device of the parent or caretaker may determine whether a distance from the child wearing wearable device 710 is too far.

In step 2050, based on determining that the distance between wearable device 710 and computing device 720 is greater than the threshold distance, generate an alert indicating that the distance between wearable device 710 and computing device 720 is greater than the threshold distance. For example, the alert may be similar to the alert described in connection with step 746.

Figure 21:
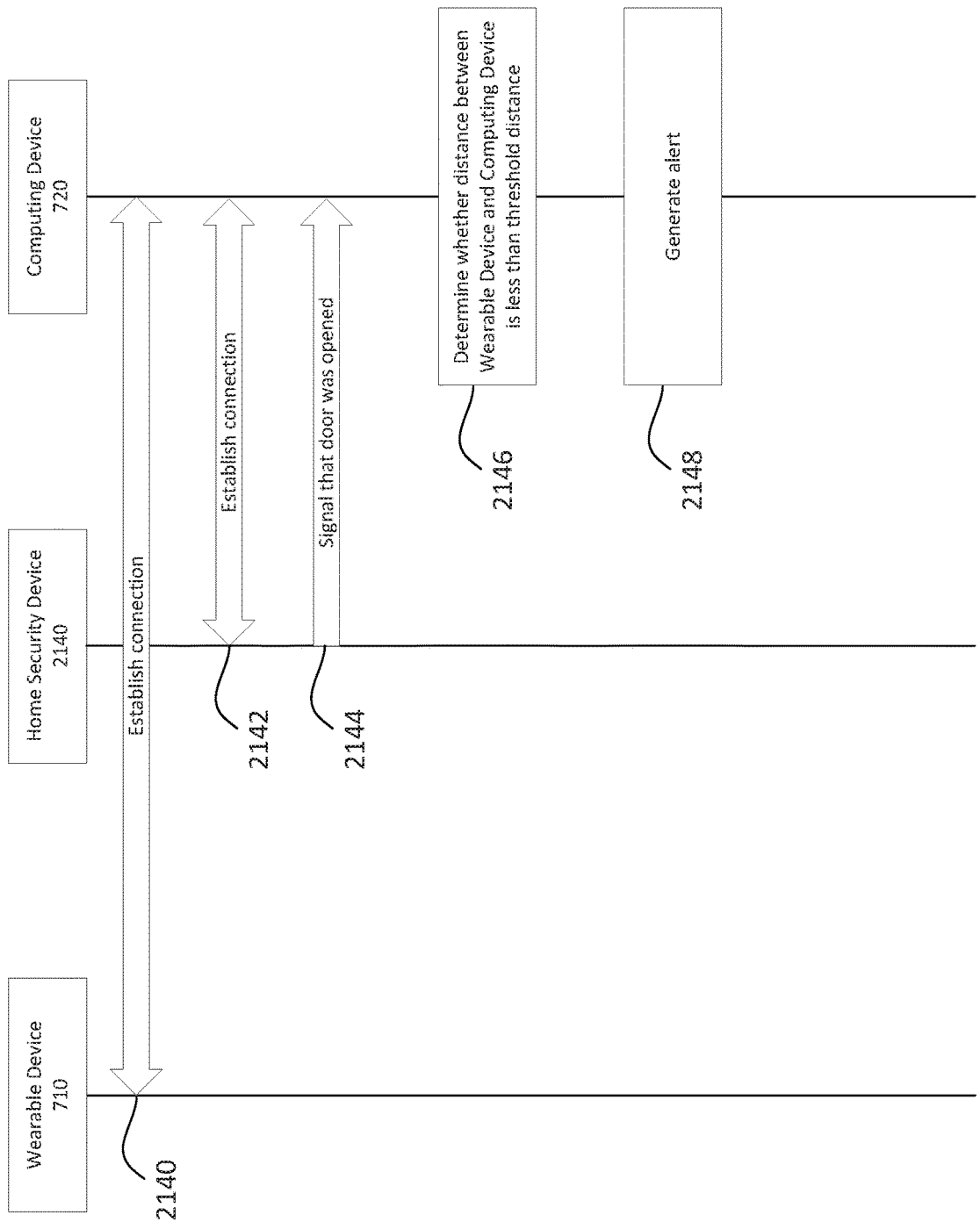
FIG. 21 depicts an illustrative flowchart of a system for tracking a wearable device, according to one or more embodiments described in this disclosure.

FIG. 21 depicts an illustrative system flow diagram of a system for tracking a wearable device, in accordance with one or more embodiments. One or more steps may be similar to one or more steps described in connection with one or more other figures herein, and the implementation details of such a step may be similar to the implementation details described in connection with one or more other figures. One or more steps may be omitted, and one or more additional steps other that those depicted may be included.

In one or more instances, a parent or caretaker may be home with a child, and feel secure knowing that the child is safe in the home. If the child leaves the home, however, the parent or caretaker may wish to be notified. Alerts from a home security system alone, however, might not provide the same level of information to the parent or caretaker, since the home security system might not be aware of a location of the child. Therefore, providing alerts to the parent or caretaker based on a combination of information collected by the home security system and a wearable device worn by the child may provide an enhanced level of safety for the child and peace of mind for the parent or caretaker.

Computing device 720 may interact with wearable device 710 and home security device 2140. Home security device 2140 may be similar to one or more other home security devices described herein (e.g., home security device 540). Home security device 2140 may be associated with a home (e.g., a home of a user of computing device 720, a home of a user of wearable device 710).

In step 2140, a connection may be established between wearable device 710 and computing device 720. For example, wearable device 710 may establish a connection with computing device 720, or computing device 720 may establish a connection with wearable device 710. The connection may be a wired or a wireless connection. For example, the connection may be a USB connection, a WiFi connection, a short-range wireless (e.g., BLUETOOTH) connection, an NFC connection, or another type of connection.

In step 2142, a connection may be established between computing device 720 and home security device 2140. For example, computing device 720 may establish a connection with home security device 2140, or home security device 2140 may establish a connection with computing device 720. The connection may be a wired or a wireless connection. For example, the connection may be a USB connection, a WiFi connection, a short-range wireless (e.g., BLUETOOTH) connection, an NFC connection, or another type of connection.

In step 2144, computing device 720 may receive, from home security device 2140, a signal that a door of the home was opened.

In step 2146, computing device 720 may, in response to receiving the signal that the door of the home was opened, determine whether the distance between wearable device 710 and computing device 720 is greater than a threshold distance.

In step 2148, computing device 720 may, in response to determining that the distance between wearable device 710 and computing device 720 is greater than the threshold distance, generate an alert indicating that the distance between wearable device 710 and computing device 720 is greater than the threshold distance and that the door of the home was opened. The alert may be similar to the alert described in connection with step 746.

FIG. 22 depicts an illustrative user interface of a computing device for tracking a wearable device, in accordance with one or more embodiments. User interface 2220 may include one or more interactive elements, such as map 2260, that provide information to a user of the computing device, including information regarding a location of the wearable device. Thus, the computing device may display, via an application, a map visually indicating the geographic location of the wearable device. The map may allow a parent or caretaker to view real-time or historical location information for a child and/or one or more others, which may assist a parent in locating a lost or missing child, or simply provide a parent with peace of mind regarding a location of a child. The map may also display real-time or historical locations of one or more other devices, such as a device of another parent or caretaker. In this manner, a parent who is not currently taking care of a child (e.g., a parent who is at work) may have peace of mind by confirming that another parent or caretaker is with the child (e.g., if the child is with the other parent, with a nanny, with a baby sitter, at a day care, at a school, at a friend's house).

Map 2260 may include a visual indication of a location 2262 of the computing device. Map 2260 may include a visual indication of a location 2264 of the wearable device. Map 2260 may update periodically (e.g., daily, every hour, every 30 minutes, every 10 minutes, every 5 minutes, every 1 minute, every 30 seconds, every 10 seconds, every 1 second) or in real-time. Alternatively or additionally, map 2260 may update when an update is requested (e.g., when user interface 2220 is displayed) by the computing device. Thus, the computing device may receive, from the wearable device, an updated geographic location of the wearable device. After receiving, from the wearable device, the updated geographic location of the wearable device, the computing device may display, via the application, an updated map visually indicating the updated geographic location of the wearable device.

User interface 2220 may be used for updating one or more settings of the wearable device. For example, user interface 2220 may receive input indicating a geographic boundary. If the wearable device crosses the geographic boundary (e.g., exits a geographic area defined by the geographic boundary), an alert may be triggered. User interface 2220 may receive input adjusting the geographic boundary.

FIGS. 23A-23D depict illustrative user interfaces of alerts for tracking a wearable device, in accordance with one or more embodiments. As described herein, a system for tracking a wearable device may generate one or more alerts on a computing device, such as a cellular phone, smartphone, laptop, tablet, smart watch, or the like, including one or more alerts responsive to a distance between the computing device and the wearable device. One or more alerts may be provided multiple times. One or more alerts may be provided via text, audio, graphics, video, or the like, similar to the alert described in connection with step 746.

FIG. 23A depicts an illustrative alert that may be generated when a computing device, such as a cellular phone, is greater than a threshold distance from a wearable device. Alert 2360 indicates that a user of the computing device is too far away from a wearable device, such as a wearable device being worn by a child that the user of the computing device is responsible for.

FIG. 23B depicts an illustrative alert that may be generated when a computing device, such as a cellular phone, is greater than a first threshold distance from a wearable device and when the wearable device is within a second threshold distance from a vehicle. Alert 2370 indicates that a user of the computing device is too far away from a wearable device, such as a wearable device being worn by a child that the user of the computing device is responsible for, while the wearable device is close to the vehicle.

FIG. 23C depicts an illustrative alert that may be generated when a computing device, such as a cellular phone, is greater than a reduced threshold distance from a wearable device and when an outdoor temperature at a geographic location of the wearable device and/or the computing device is above a temperature threshold. Alert 2380 indicates that the outdoor temperature is high, and that a user of the computing device is too far away from a wearable device, such as a wearable device being worn by a child that the user of the computing device is responsible for.

FIG. 23D depicts an illustrative alert that may be generated when a computing device, such as a cellular phone, is greater than a threshold distance from a wearable device and when a home security system has detected a door opening in a home of a user of the computing device. Alert 2390 indicates that the door in the home of the user of the computing device was opened, and may include a time that the door was opened. Alert 2390 indicates that the user of the computing device is too far away from a wearable device, such as a wearable device being worn by a child that the user of the computing device is responsible for.

One or more functions described herein may be performed by one or more processors of one or more systems, apparatus, or computing devices, coupled to one or more memories storing computer-readable instructions that, when executed by the one or more processors, cause the one or more systems, apparatus, or computing devices to perform one or more functions described herein. Alternatively or additionally, the disclosure may be embodied in one or more computer-readable media storing computer-readable instructions that, when executed by one or more processors, cause a system, apparatus, or computing device to perform one or more functions described herein.

Various modifications and additions can be made to the exemplary embodiments discussed without departing from the scope of the present invention. For example, while the embodiments described above refer to particular features or particular steps, the scope of this disclosure also includes embodiments having different combinations of features or steps, including features or steps described in connection with a different embodiment. One or more embodiments might not include all of the described features or steps. Accordingly, the scope of the present disclosure is intended to embrace all such alternatives, modifications, and variations as fall within the scope of the claims, together with all equivalents thereof

What is claimed is:

1. A system comprising:
    a first device comprising:
        a silicone band configured to be worn around a wrist of a user or an ankle of the user, the silicone band holding a waterproof housing with an external universal serial bus (USB) interface and an input button, the waterproof housing containing at least:
            a global positioning system (GPS) device;
            a cellular network radio;
            a short-range wireless device;
            a rechargeable battery configured to be rechargeable via the external USB interface;
            a processor; and
            memory storing instructions that, when executed by the processor of the first device, cause the first device to:
                receive, via the input button, an indication that the input button on the first device was pressed;
                in response to receiving the indication that the input button on the first device was pressed, transmit, via the cellular network radio and to a second device, a signal that the input button on the first device was pressed;
                receive, via the GPS device, signals indicative of a geographic location of the first device;
                determine, based on the signals indicative of the geographic location of the first device, the geographic location of the first device;
                transmit, via the cellular network radio and to the second device, the geographic location of the first device; and
                establish, via the short-range wireless device, a short-range wireless connection with the second device; and
    a second device comprising:
        a processor; and
        memory storing instructions that, when executed by the processor of the second device, cause the second device to:
            receive the signal that the input button on the first device was pressed;
            in response to receiving the signal that the input button on the first device was pressed, generate an alert indicating that the input button on the first device was pressed;
            receive the geographic location of the first device;
            determine, based on the geographic location of the first device, whether the first device is outside a defined geographic boundary;
            in response to determining that the first device is outside the defined geographic boundary, generate an alert indicating that the first device is outside the defined geographic boundary;
            determine, based on the short-range wireless connection, whether a distance between the first device and the second device is greater than a threshold distance; and
            in response to determining that the distance between the first device and the second device is greater than the threshold distance, generate an alert indicating that the distance between the first device and the second device is greater than the threshold distance;
            receive an input requesting to deactivate the alert indicating that the distance between the first device and the second device is greater than the threshold distance; and
            in response to receiving the input requesting to deactivate the alert indicating that the distance between the first device and the second device is greater than the threshold distance, determine whether the distance between the first device and the second device is less than the threshold distance.

2. The system of claim 1, wherein the memory of the second device stores instructions that, when executed by the processor of the second device, cause the second device to: in response to receiving the signal that the input button on the first device was pressed, provide, with the alert indicating that the input button on the first device was pressed, the geographic location of the first device.

3. The system of claim 1, wherein the memory of the second device stores instructions that, when executed by the processor of the second device, cause the second device to: receive input adjusting the threshold distance; and determine, based on the short-range wireless connection, whether the distance between the first device and the second device is greater than the adjusted threshold distance.

4. The system of claim 1, wherein the first device comprises a WiFi radio, and wherein the memory of the first device stores instructions that, when executed by the processor of the first device, cause the first device to:
    receive, via the external USB interface or the WiFi radio, updated instructions that control operation of the first device; and
    store the updated instructions that control operation of the first device.

5. The system of claim 1, wherein the first device comprises a WiFi radio, and wherein the memory of the first device stores instructions that, when executed by the processor of the first device, cause the first device to:

establish a USB connection or a WiFi connection with the second device; and transmit, to the second device, a backup copy of information stored on the first device.

6. The system of claim 1, wherein the memory of the second device stores instructions that, when executed by the processor of the second device, cause the second device to:

display, via an application, a map visually indicating the geographic location of the first device;

receive, from the first device, an updated geographic location of the first device; and after receiving, from the first device, the updated geographic location of the first device, display, via the application, an updated map visually indicating the updated geographic location of the first device.

7. The system of claim 1, wherein the memory of the second device stores instructions that, when executed by the processor of the second device, cause the second device to:

receive a second signal indicating that the input button on the first device was pressed;

determine, based on the second signal indicating that the input button on the first device was pressed:

whether a time of the second signal was after generation of the alert indicating that the distance between the first device and the second device is greater than the threshold distance, and whether the time of the second signal was after determining that the distance between the first device and the second device is less than the threshold distance; and based on determining that the time of the second signal was after the generation of the alert indicating that the distance between the first device and the second device is greater than the threshold distance and after the determining that the distance between the first device and the second device is less than the threshold distance, deactivate the alert indicating that the distance between the first device and the second device is greater than the threshold distance.

8. The system of claim 1, wherein the first device comprises a vibration element, and wherein the memory of the first device stores instructions that, when executed by the processor of the first device, cause the first device to:

receive a signal indicating that the distance between the first device and the second device is greater than the threshold distance; and in response to receiving the signal indicating that the distance between the first device and the second device is greater than the threshold distance, cause the vibration element to vibrate.

9. The system of claim 1, wherein the first device comprises a heart-rate sensor, and wherein the memory of the first device stores instructions that, when executed by the processor of the first device, cause the first device to:

determine, via the heart-rate sensor, a heart rate of the user of the first device; and transmit, to the second device, the heart rate of the user of the first device.

10. The system of claim 1, comprising a third device associated with a vehicle, wherein the memory of the first device stores instructions that, when executed by the processor of the first device, cause the first device to:

establish a connection between the first device and the third device associated with the vehicle; and transmit, to the second device, an indication of the connection between the first device and the third device associated with the vehicle; and wherein the memory of the second device stores instructions that, when executed by the processor of the second device, cause the second device to:

establish a connection between the second device and the third device associated with the vehicle;

receive the indication of the connection between the first device and the third device associated with the vehicle;

determine, based on the indication of the connection between the first device and the third device associated with the vehicle, whether the distance between the first device and the third device associated with the vehicle is less than the threshold distance;

determine, based on the connection between the second device and the third device associated with the vehicle, a distance between the second device and the third device associated with the vehicle;

determine, based on the distance between the second device and the third device associated with the vehicle, whether the distance between the second device and the third device associated with the vehicle is greater than the threshold distance; and based on determining that the distance between the first device and the third device associated with the vehicle is less than the threshold distance and that the distance between the second device and the third device associated with the vehicle is greater than the threshold distance, generate an alert indicating that the distance between the first device and the third device associated with the vehicle is less than the threshold distance and that the distance between the second device and the third device associated with the vehicle is greater than the threshold distance.

11. The system of claim 1, wherein the memory of the second device stores instructions that, when executed by the processor of the second device, cause the second device to:

determine a geographic location of the second device;

determine an outdoor temperature of the geographic location of the second device;

determine whether the outdoor temperature of the geographic location of the second device is greater than a threshold temperature;

based on determining that the outdoor temperature of the geographic location of the second device is greater than the threshold temperature, reduce the threshold distance; and in response to determining that the distance between the first device and the second device is greater than the reduced threshold distance, generate an alert indicating that the distance between the first device and the second device is greater than the reduced threshold distance.

12. The system of claim 1, wherein the memory of the second device stores instructions that, when executed by the processor of the second device, cause the second device to:

determine a geographic location of the second device;

determine an outdoor temperature of the geographic location of the second device;

determine whether the outdoor temperature of the geographic location of the second device is greater than a threshold temperature; and generate an alert indicating that the outdoor temperature of the geographic location of the second device is greater than the threshold temperature.

13. A system comprising:

a silicone band configured to be worn by a user, the silicone band holding a waterproof housing with an external universal serial bus (USB) interface and an input button, the waterproof housing containing at least:

a WiFi radio;

a short-range wireless device;

a rechargeable battery configured to be rechargeable via the external USB interface;

a processor; and memory storing instructions that, when executed by the processor, cause the processor to:

receive geographic location information for the silicone band; and transmit the geographic location information for the silicone band; and a computing device comprising:

a processor; and memory storing instructions that, when executed by the processor of the computing device, cause the computing device to:

establish a short-range wireless connection with a device associated with a vehicle:

determine that the short-range wireless connection with the device associated with the vehicle has terminated;

receive the geographic location information for the silicone band;

determine, based on the geographic location information for the silicone band, a geographic location of the silicone band;

based on determining that the short-range wireless connection with the device associated with the vehicle has terminated, determine a distance between the silicone band and the computing device; and based on determining that the distance between the silicone band and the computing device is greater than a threshold distance, generate an alert indicating that the distance between the silicone band and the computing device is greater than the threshold distance.

14. The system of claim 13, wherein the memory of the computing device stores instructions that, when executed by the processor of the computing device, cause the computing device to:

receive an input requesting to deactivate the alert indicating that the distance between the silicone band and the computing device is greater than the threshold distance; and in response to receiving the input requesting to deactivate the alert indicating that the distance between the silicone band and the computing device is greater than the threshold distance, determine whether a new distance between the silicone band and the computing device is less than the threshold distance.

15. The system of claim 14, wherein the memory of the computing device stores instructions that, when executed by the processor of the computing device, cause the computing device to:

receive a signal indicating that the input button on the silicone band was pressed;

determine, based on the signal indicating that the input button on the silicone band was pressed:

whether a time of the signal was after generation of the alert indicating that the distance between the silicone band and the computing device is greater than the threshold distance, and whether the time of the signal was after determining that the new distance between the silicone band and the computing device is less than the threshold distance; and based on determining that the time of the signal was after the generation of the alert indicating that the distance between the silicone band and the computing device is greater than the threshold distance and after the determining that the new distance between the silicone band and the computing device is less than the threshold distance, deactivate the alert indicating that the distance between the silicone band and the computing device is greater than the threshold distance.

16. The system of claim 13, wherein the memory of the computing device stores instructions that, when executed by the processor of the computing device, cause the computing device to:

determine a geographic location of the computing device;

determine an outdoor temperature of the geographic location of the computing device;

determine whether the outdoor temperature of the geographic location of the computing device is greater than a threshold temperature;

based on determining that the outdoor temperature of the geographic location of the computing device is greater than the threshold temperature, reduce the threshold distance; and in response to determining that the distance between the silicone band and the computing device is greater than the reduced threshold distance, generate an alert indicating that the distance between the silicone band and the computing device is greater than the reduced threshold distance.

17. A system comprising:

a first device comprising:

a silicone band configured to be worn by a user, the silicone band holding a waterproof housing with an external universal serial bus (USB) interface and an input button, the waterproof housing containing at least:

a global positioning system (GPS) device;

a cellular network radio;

a short-range wireless device;

a rechargeable battery configured to be rechargeable via the external USB interface;

a processor; and memory storing instructions that, when executed by the processor of the first device, cause the first device to:

receive, via the GPS device, signals indicative of a geographic location of the first device;

determine, based on the signals indicative of the geographic location of the first device, the geographic location of the first device; and transmit, via the cellular network radio and to the second device, the geographic location of the first device; and a second device comprising:
  a processor; and
  memory storing instructions that, when executed by the processor of the second device, cause the second device to:
    receive the geographic location of the first device;
    determine a geographic location of the second device;
    determine an outdoor temperature of the geographic location of the second device;
    determine whether the outdoor temperature of the geographic location of the second device is greater than a threshold temperature;
    based on determining that the outdoor temperature of the geographic location of the second device is greater than the threshold temperature, reduce a threshold distance;
    determine whether a distance between the first device and the second device is greater than the reduced threshold distance; and
    in response to determining that the distance between the first device and the second device is greater than the reduced threshold distance, generate an alert indicating that the distance between the first device and the second device is greater than the reduced threshold distance.

18. The system of claim 17, wherein the memory of the second device stores instructions that, when executed by the processor of the second device, cause the second device to:
  receive an input requesting to deactivate the alert indicating that the distance between the first device and the second device is greater than the reduced threshold distance;
  in response to receiving the input requesting to deactivate the alert indicating that the distance between the first device and the second device is greater than the reduced threshold distance, determine whether a new distance between the first device and the second device is less than the reduced threshold distance;
  receive a signal indicating that the input button on the first device was pressed;
  determine, based on the signal indicating that the input button on the first device was pressed:
    whether a time of the signal was after generation of the alert indicating that the distance between the first device and the second device is greater than the reduced threshold distance, and
    whether the time of the signal was after determining that the new distance between the first device and the second device is less than the reduced threshold distance; and
  based on determining that the time of the signal was after the generation of the alert indicating that the distance between the first device and the second device is greater than the reduced threshold distance and after the determining that the new distance between the first device and the second device is less than the threshold distance, deactivate the alert indicating that the distance between the first device and the second device is greater than the reduced threshold distance.

19. The system of claim 17, wherein the memory of the second device stores instructions that, when executed by the processor of the second device, cause the second device to:
  establish a short-range wireless connection with a third device associated with a vehicle;
  determine that the short-range wireless connection with the third device associated with the vehicle has terminated;
  based on determining that the short-range wireless connection with the third device associated with the vehicle has terminated, determine a new distance between the first device and the second device; and
  based on determining that the new distance between the first device and the second device is greater than the reduced threshold distance, generate an alert indicating that the new distance between the first device and the second device is greater than the reduced threshold distance.

\* \* \* \* \*